US008031715B1

(12) United States Patent
Chang et al.

(10) Patent No.: US 8,031,715 B1
(45) Date of Patent: ***Oct. 4, 2011

(54) NETWORK DEVICE HAVING SERVICE CARD FOR DYNAMIC FLOW CAPTURE AND MONITORING OF PACKET FLOWS

(75) Inventors: Szelap Philip Chang, San Jose, CA (US); Manoj Apte, San Jose, CA (US); Saravanan Deenadayalan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,576

(22) Filed: Dec. 14, 2009

Related U.S. Application Data

(63) Continuation of application No. 11/561,726, filed on Nov. 20, 2006, now Pat. No. 7,633,944, and a continuation-in-part of application No. 11/516,878, filed on Sep. 7, 2006, now Pat. No. 7,809,827.

(60) Provisional application No. 60/840,822, filed on Aug. 29, 2006, provisional application No. 60/799,872, filed on May 12, 2006.

(51) Int. Cl.
 *H04L 12/28* (2006.01)
(52) U.S. Cl. .......................... 370/392; 710/62
(58) Field of Classification Search .................. 370/392, 370/465; 710/62
 See application file for complete search history.

(56) References Cited

U.S. PATENT DOCUMENTS

| | | | |
|---|---|---|---|
| 3,962,681 A | 6/1976 | Requa et al. | |
| 4,032,899 A | 6/1977 | Jenny et al. | |
| 4,600,319 A | 7/1986 | Everett, Jr. | |
| 5,375,216 A | 12/1994 | Moyer et al. | |
| 5,408,539 A | 4/1995 | Finlay et al. | |
| 5,490,252 A | 2/1996 | Macera et al. | |
| 5,509,123 A | 4/1996 | Dobbins et al. | |
| 5,530,958 A | 6/1996 | Agarwal et al. | |

(Continued)

FOREIGN PATENT DOCUMENTS

WO 98/36532 A1 8/1998

(Continued)

OTHER PUBLICATIONS

"The CAIDA Web Site," www.caida.org/, 2002, 1 pg.

(Continued)

*Primary Examiner* — Dang T Ton
*Assistant Examiner* — Wei Zhao
(74) *Attorney, Agent, or Firm* — Shumaker & Sieffert, P.A.

(57) ABSTRACT

A network device comprises a service card (e.g., a dynamic flow capture (DFC) service card) executing a communication protocol to receive, from one or more control sources, flow capture information specifying at least one destination and criteria for matching one or more packet flows. The network device includes a network interface card to receive a packet from a network, a packet replication module to replicate the packet, and a control unit to provide the replicated packet from the interface card to the DFC service card. The network device includes a filter cache that caches flow capture information recently received from the control sources. The network device may provide real-time intercept and relaying of specified network-based communications. Moreover, the techniques described herein allow control sources to tap packet flows with little delay after specifying flow capture information, e.g., within 50 milliseconds, even under high-volume networks.

16 Claims, 14 Drawing Sheets

U.S. PATENT DOCUMENTS

| | | | |
|---|---|---|---|
| 5,568,471 | A | 10/1996 | Hershey et al. |
| 6,011,795 | A | 1/2000 | Varghese et al. |
| 6,018,765 | A | 1/2000 | Durana et al. |
| 6,148,335 | A | 11/2000 | Haggard et al. |
| 6,182,146 | B1 | 1/2001 | Graham-Cumming, Jr. |
| 6,321,338 | B1 | 11/2001 | Porras et al. |
| 6,392,996 | B1 | 5/2002 | Hjalmtysson |
| 6,499,088 | B1 | 12/2002 | Wexler et al. |
| 6,501,752 | B1 | 12/2002 | Kung et al. |
| 6,563,796 | B1 | 5/2003 | Saito |
| 6,584,548 | B1 | 6/2003 | Bourne et al. |
| 6,594,268 | B1 | 7/2003 | Aukia et al. |
| 6,598,034 | B1 | 7/2003 | Kloth |
| 6,651,098 | B1 | 11/2003 | Carroll et al. |
| 6,735,201 | B1 | 5/2004 | Mahajan et al. |
| 6,751,663 | B1 | 6/2004 | Farrell et al. |
| 6,826,713 | B1 | 11/2004 | Beesley et al. |
| 6,889,181 | B2 | 5/2005 | Kerr et al. |
| 6,983,294 | B2 | 1/2006 | Jones et al. |
| 6,985,956 | B2 | 1/2006 | Luke et al. |
| 7,031,304 | B1 | 4/2006 | Arberg et al. |
| 7,055,174 | B1 | 5/2006 | Cope et al. |
| 7,058,974 | B1 | 6/2006 | Maher, III et al. |
| 7,120,931 | B1 | 10/2006 | Cheriton |
| 7,139,242 | B2 | 11/2006 | Bays |
| 7,185,103 | B1 | 2/2007 | Jain |
| 7,231,459 | B2 | 6/2007 | Saraph et al. |
| 7,251,215 | B1 | 7/2007 | Turner et al. |
| 7,254,114 | B1 | 8/2007 | Turner et al. |
| 7,292,573 | B2 | 11/2007 | LaVigne et al. |
| 7,313,100 | B1 | 12/2007 | Turner et al. |
| 7,369,557 | B1 | 5/2008 | Sinha |
| 7,386,108 | B1 | 6/2008 | Zave et al. |
| 7,420,929 | B1 | 9/2008 | Mackie |
| 7,433,966 | B2 | 10/2008 | Charny et al. |
| 7,496,650 | B1 * | 2/2009 | Previdi et al. ............ 709/223 |
| 7,561,569 | B2 | 7/2009 | Thiede |
| 7,580,356 | B1 | 8/2009 | Mishra et al. |
| 7,633,944 | B1 | 12/2009 | Chang et al. |
| 7,664,855 | B1 | 2/2010 | Freed et al. |
| 2002/0163932 | A1 * | 11/2002 | Fischer et al. ............ 370/465 |
| 2003/0120769 | A1 | 6/2003 | McCollom et al. |
| 2003/0145232 | A1 | 7/2003 | Poletto et al. |
| 2003/0214913 | A1 | 11/2003 | Kan et al. |
| 2007/0016702 | A1 * | 1/2007 | Pione et al. ............ 710/62 |
| 2007/0058558 | A1 * | 3/2007 | Cheung et al. ............ 370/252 |
| 2007/0076658 | A1 | 4/2007 | Park et al. |
| 2007/0121812 | A1 | 5/2007 | Strange et al. |

FOREIGN PATENT DOCUMENTS

WO      02/084920 A2      10/2002

OTHER PUBLICATIONS

"About Endace," www.endace.com/, 2002, 1 pg.
"Cisco IOS NetFlow," www.cisco.com/warp/public/732/Tech/nmp/netflow/index.shtml, 2002, 1 pg.
Weaver et al., "A Real-Time Monitor for Token Ring Networks," Military Communications Conference, 1989, MILCOM '89, Oct. 1989, vol. 3, pp. 794-798.
Dini, P. et al., "Performance Evaluation for Distributed System Components," Proceedings of IEEE Second International Workshop on Systems Management, Jun. 1996, pp. 20-29.
Integrated Services Adapter, 2000, Cisco Systems, Data Sheet, pp. 1-6, http://www.cisco.com/warp/public/cc/pd/ifaa/svaa/iasvaa/prodlit/ism2_ds.pdf.
"Well-Known TCP Port Number," www.webopedia.com, 2004, 3 pgs.
"TCP Packet Field Descriptions," www.ipanalyser.co.uk, Analyser Sales Ltd., Copyright 2003, 2 pages.
Michael Egan, "Decomposition of a 2000 TCP Packet," www.passwall.com, 3 pages, Aug. 7, 2000.
Mark Gibbs, "A Guide to Original SYN," www.nwfusion.com, Network World, Nov. 2000, 4 pp.
"Sample TCP/IP Packet," www.passwall.com, Version 0.0.0 @ 03:55/Aug. 7, 2000, Copyright 2002, 6 pp.
D.J. Bernstein, "SYN Cookies," http://cr.yp.to/syncookies.html, Oct. 2003, 3 pp.
Jonathan Lemon, "Resisting SYN Flood DoS Attacks with a SYN Cache," http://people.freebsd.org/~jlemon/papers/syncache.pdf, 9 pages.
Stuart Staniford et al., "Practical Automated Detection of Stealthy Portscans," http://downloads.securityfocus.com/library/spice-ccs2000.pdf, 16 pages.
PCI Technology Overview, Feb. 2003, www.cs.unc.edu/Research/stc/FAQs/pci-overview.pdf.
U.S. Appl. No. 11/516,878, by Manoj Apte, filed Sep. 7, 2006.
U.S. Appl. No. 11/517,232, by Manoj Apte, filed Sep. 7, 2006.
Office Action from U.S. Appl. No. 11/516,878 dated Oct. 14, 2009, 52 pp.
Response to Office Action dated Oct. 14, 2009, for U.S. Appl. No. 11/516,878, filed Jan. 14, 2010, 23 pp.
Office Action from U.S. Appl. No. 11/516,878, dated Apr. 16, 2010, 39 pp.
Office Action from U.S. Appl. No. 11/561,726, dated Mar. 26, 2009, 18 pp.
Response to Office Action dated Mar. 26, 2009, for U.S. Appl. No. 11/561,726, filed Jan. 14, 2010, 12 pp.
Notice of Allowance from U.S. Appl. No. 11/561,726, mailed Sep. 29, 2009, 9 pp.
Office Action from U.S. Appl. No. 11/517,232, dated Apr. 23, 2009, 28 pp.
Response to Office Action dated Apr. 23, 2009, for U.S. Appl. No. 11/517,232, filed Jul. 23, 2009, 22 pp.
Office Action from U.S. Appl. No. 11/517,726, dated Oct. 19, 2009, 34 pp.
Response to Office Action dated Oct. 19, 2009, for U.S. Appl. No. 11/517,232, filed Jan. 11, 2010, 13 pp.
Notice of Allowance from U.S. Appl. No. 11/517,232, mailed Mar. 9, 2010, 7 pp.
Response to Office Action dated Apr. 16, 2010, from U.S. Appl. No. 11/516,878, filed May 24, 2010, 13 pp.
Notice of Allowance from U.S. Appl. No. 11/516,878, mailed Jun. 14, 2010, 8 pp.
Notice of Allowance for U.S. Appl. No. 12/364,912 dated Sep. 2, 2010, 13 pgs.
Office Action from U.S. Appl. No. 10/228,132, dated Oct. 17, 2006, 15 pp.
Response to Office Action dated Oct. 17, 2006, from U.S. Appl. No. 10/228,132, filed Jan. 17, 2007, 15 pp.
Office Action from U.S. Appl. No. 10/228,132, dated Apr. 6, 2007, 7 pp.
Response to Office Action dated Apr. 6, 2007, from U.S. Appl. No. 10/228,132, filed May 7, 2007, 8 pp.
Notice of Allowance from U.S. Appl. No. 10/228,132, dated Jun. 4, 2007, 4 pp.
Office Action from U.S. Appl. No. 11/744,982, dated Jul. 24, 2008, 6 pp.
Response to Office Action dated Jul. 24, 2008, from U.S. Appl. No. 11/744,982, filed Oct. 24, 2008, 2 pp.
Notice of Allowance from U.S. Appl. No. 11/744,982, dated Dec. 12, 2008, 4 pp.
Office Action from U.S. Appl. No. 12/364,912, dated Apr. 20, 2010, 10 pp.
Response to Office Action dated Apr. 20, 2010, from U.S. Appl. No. 12/364,912, filed Jun. 30, 2010, 7 pp.
Office Action from U.S. Appl. No. 10/228,114, dated Oct. 17, 2006, 21 pp.
Response to Office Action dated Oct. 17, 2006, from U.S. Appl. No. 10/228,114, filed Jan. 17, 2007, 15 pp.
Office Action from U.S. Appl. No. 10/228,114, dated Mar. 9, 2007, 17 pp.
Response to Office Action dated Mar. 9, 2007, from U.S. Appl. No. 10/228,114, filed Apr. 10, 2007, 15 pp.
Notice of Allowance from U.S. Appl. No. 10/228,114, dated Jun. 14, 2007, 6 pp.

* cited by examiner

FILTER TABLE 54

| CRITERIA ID 72 | 5-TUPLE CRITERIA 74 | ADD/REFRESH TIMESTAMP 73 | TRAFFIC TIMESTAMP 75 | TOTAL TIMEOUT 76 | IDLE TIMEOUT 77 | PACKET TIMEOUT 78 | BYTE TIMEOUT 80 |
|---|---|---|---|---|---|---|---|
| A | S1, D1, 80, 80, HTTP | 11:45:59 | 08:01:35 | 86400 | 300 | 5,000 | 100,000 |
| B | *, D2, 80, 80, HTTP | 04:15:28 | 07:52:00 | 64800 | * | * | * |
| C | S2, *, 80, 80, HTTP | 07:32:01 | -:-:- | 43200 | 3600 | 20,000 | * |
| ... | ... | ... | ... | ... | ... | ... | ... |
| M | | | | | | | |

FIG. 5

FILTER CACHE ← 50

| CRITERIA IDENTIFIER (82) | 5-TUPLE CRITERIA (84) | CS (86) | CD (88) | ADD TIME (90) |
|---|---|---|---|---|
| N | S2, D4, 80, 80, HTTP | CS1 | CS1 | 08:01:20 |
| ⋮ | ⋮ | ⋮ | ⋮ | ⋮ |
| Z | ... | ... | ... | ... |

FIG. 6

FLOW CACHE

| FLOW HASH | MATCHING CRITERIA | EXP. TIME | TIMER DURATION |
|---|---|---|---|
| H172 | {F2; A} | 22:25:10 | 5 MIN |
|  |  |  |  |
| H105 | {F1; A, B}　　{F4; C} | 21:05:15 | 5 MIN |
|  |  |  |  |
| H30 | {F3; 0} | 19:53:46 | 5 MIN |
|  |  |  |  |

FIG. 7

NETWORK DEVICE HAVING SERVICE CARD FOR DYNAMIC FLOW CAPTURE AND MONITORING OF PACKET FLOWS

This application is a continuation of U.S. application Ser. No. 11/561,726, filed on Nov. 20, 2006, which claims the benefit of U.S. Provisional Application No. 60/799,872, filed May 12, 2006, and of U.S. Provisional Application No. 60/840,822, filed Aug. 29, 2006, the entire content of each of which is incorporated herein by reference. U.S. application Ser. No. 11/561,726 is a continuation-in-part of U.S. application Ser. No. 11/516,878, filed Sep. 7, 2006, which claims the benefit of U.S. Provisional Application No. 60/799,872, filed May 12, 2006, the entire content of each of which is incorporated herein by reference.

TECHNICAL FIELD

The invention relates to computer networks and, more particularly, to techniques for managing timeouts when capturing traffic flows within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The packets are communicated according to a communication protocol that defines the format of the packet. A typical packet, for example, includes a header carrying source and destination information, as well as a payload that carries the actual data. The de facto standard for communication in conventional packet-based networks, including the Internet, is the Internet Protocol (IP).

In some cases, a control source (CS) may require the system administrator to mirror network traffic flowing to and from a designated network user. The original network traffic is routed across the network as usual while a mirrored version of the network traffic is forwarded for analysis. Conventionally, flow capture of a network service, such as VoIP, has been enabled and managed by the system administrator interacting with a command line interface presented by a network device providing the network service. This technique may become difficult as the number of network services and respective devices increase. Delay and other difficulties may arise as both the number of filtering criteria entered and the number packet flows being monitored increases. For example, an undesirably long delay may occur from the time a new filtering criterion is entered until packets meeting the criterion may be captured.

Each of the filtering criteria may have one or more associated timeouts that indicate when the filtering criterion expires. Typically, a timer is defined for each timeout, and the timeouts are updated whenever packets are received that match the filtering criterion. This approach requires an operating system of the network device performing the monitoring to provide support for an extremely large number of timers. The operating system typically maintains the timers within kernel memory, and software applications executing on the monitoring network device repeatedly invoke the operating system to utilize the timers.

SUMMARY

Given the potentially high volume of flows being concurrently monitored, and the corresponding large number of timers being used, the conventional approaches described above require significant computing overhead. That is, the repeated calls to the operating system to create, check and terminate timers are computationally expensive and demanding of CPU power given the significant number of timers that may be required for a high-bandwidth flow capture and network monitoring device.

In general, a network monitor is described that utilizes one or more dynamic flow capture (DFC) service cards to provide real-time intercept and relaying of specified network-based communications, even under high-volume traffic rates. The techniques are described herein by way of example to dynamic flow capture (DFC) service cards that can monitor and distribute targeted network communications to content destinations under high traffic rates, even core traffic rates of the Internet, including OC-3, OC-12, OC-48, OC-192, and higher rates. Moreover, the techniques described herein allow control sources (such as Internet service providers, customers, or law enforcement agencies) to tap new or current packet flows within an extremely small period of time after specifying flow capture information, e.g., within 50 milliseconds, even under high-volume networks.

Further, the techniques can readily be applied in large networks that may have one or more million of concurrent packet flows, and where control sources may define hundreds of thousands of filter criteria entries in order to target specific communications. The filter criteria entries are stored in a data structure, such as a filter table. Each of the filter criteria entries may have one or more associated timeouts, which indicate when the filter criteria entry expires and should be removed from the filter table. The techniques allow for handling the large amount of timeouts used when monitoring a high volume of packet flows, while requiring only minimal use of the operating system for managing the timeouts. That is, flow matching software is described that maintains a timeout data structure outside of the operating system, i.e., in user space. In one example embodiment, the timeout data structure is a circular array having a plurality of elements. The circular array is defined to represent a span of time, where each element represents a unit of time. As one example, each element may contain one or more pointers. For example, the pointer for a given entry of the timeout data structure may point to an entry in the filter table in the event filter criteria is associated with the unit of time for that entry. A null pointer may be used to indicate that no filter criteria are associated with the particular unit of time. As another example, each element may contain one or more identifiers that identify respective entries in the filter table. Each identifier may be a unique ID that can be used to return the entry in the filter table, where the filter table is a data structure such as a trie or tree.

A timer thread periodically checks the timeout data structure to determine whether any timeouts occur at the current time. That is, the timer thread periodically "wakes up" and checks the element of the array corresponding to the current time unit to determine whether any filter criteria are set to expire at the current time unit. The timer thread may check the element of the array corresponding to the current time unit by computing an index into the array based on the current time, thereby avoiding costly array traversals.

The techniques can readily be applied to a variety of environments where multiple control sources independently monitor and intercept particular packet flows. Examples of such environments include distributed system administration, accounting and billing systems, network traffic analysis, network attack detection, intrusion detection, lawful intercept, and the like. Moreover, the techniques may be applied to any environment in which a large number of timers may be maintained. In one embodiment, a method for maintaining timers comprises defining a timeout array comprising a plurality of elements, wherein the timeout array represents a span of time and the elements represent sequential units of time receiving information specifying one or more items and a timeout associated with each of the items; and updating an element of the timeout array to identify the item, wherein the updated element represents a time unit within the span of time that corresponds to the timeout for the item.

In one embodiment, a method comprises defining a timeout array comprising a plurality of elements, wherein the timeout array represents a span of time and the elements represent sequential units of time. The method further comprises executing a communication protocol to receive information specifying one or more filter criteria for matching one or more packet flows and a timeout associated with the filter criteria, and updating an element of the timeout array to identify the filter criteria, wherein the updated element represents a time unit within the span of time that corresponds to the timeout for the filter criteria.

In another embodiment, a network device comprises a timeout array comprising a plurality of elements, wherein the timeout array represents a span of time and the elements represent sequential units of time. The network device further comprises a communication protocol to receive information specifying one or more filter criteria for matching one or more packet flows and a timeout associated with the criteria, and flow match timer module that updates an element of the timeout array to identify the filter criteria, wherein the updated element represents a time unit within the span of time that corresponds to the timeout for the filter criteria.

In another embodiment, a computer-readable medium comprises instructions for causing a programmable processor to define a timeout array comprising a plurality of elements, wherein the timeout array represents a span of time and the elements represent sequential units of time. The instructions further cause the programmable processor to execute a communication protocol to receive information specifying one or more filter criteria for matching one or more packet flows and a timeout associated with the filter criteria, and update an element of the timeout array to identify the filter criteria, wherein the updated element represents a time unit within the span of time that corresponds to the timeout for the filter criteria.

In yet another embodiment, a network device comprises a dynamic flow capture (DFC) service card executing a communication protocol to receive, from one or more control sources (CSs), flow capture information specifying at least one destination, filter criteria for matching one or more packet flows, and a timeout associated with the filter criteria. The network device further includes a network interface card to receive a packet from a network, a packet replication module to replicate the packet, and a control unit to provide the replicated packet from the interface card to the DFC service card. The network device also includes a timeout array comprising a plurality of elements, wherein the timeout array represents a span of time and the elements represent sequential units of time.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 5 is a block diagram illustrating an exemplary filter table data structure maintained by the service card.

FIG. 6 is a block diagram illustrating an exemplary filter cache data structure maintained by the service card.

FIG. 7 is a block diagram illustrating an exemplary flow cache data structure maintained by the service card.

DETAILED DESCRIPTION

Figure 1:
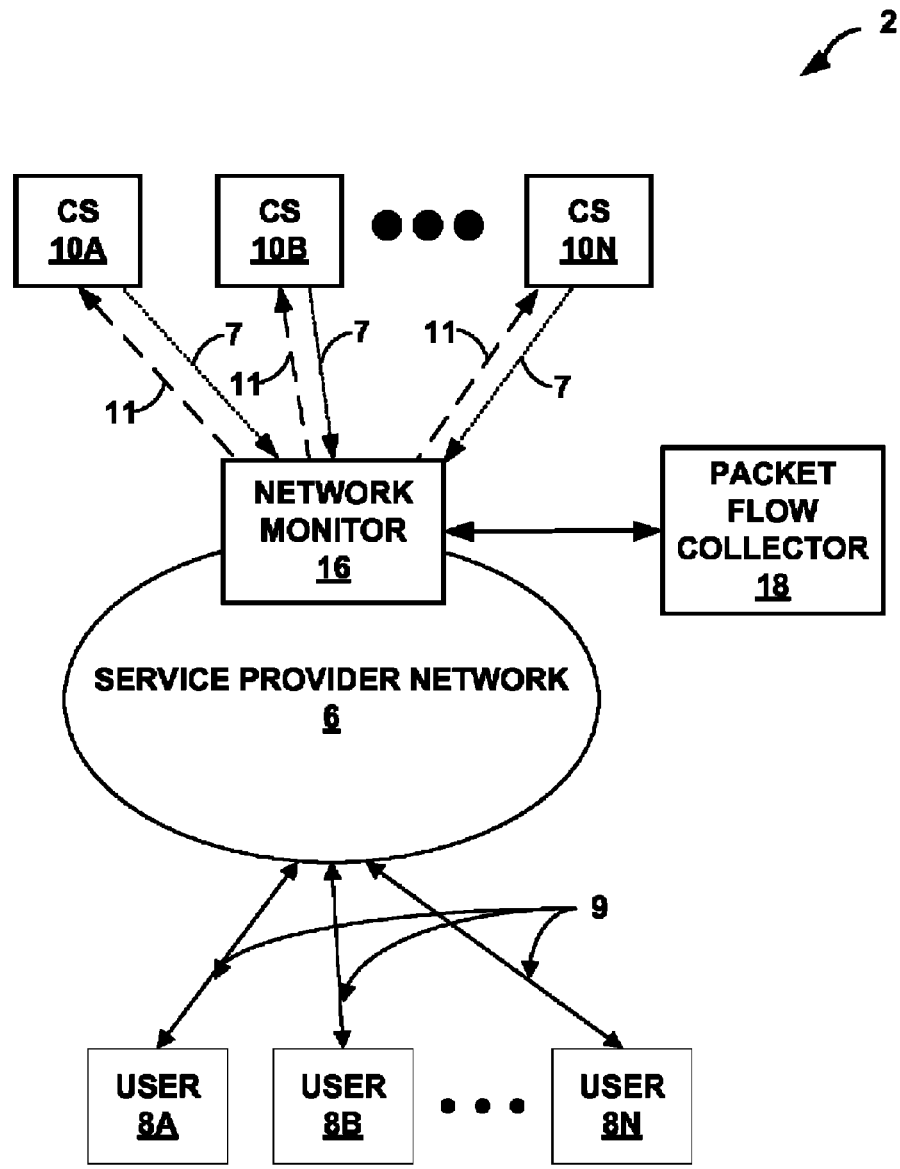
FIG. 1 is a block diagram illustrating an exemplary computer network in which a network monitor monitors packet flows consistent with the principles of the invention.

FIG. 1 illustrates an exemplary dynamic flow capture system 2 in which network monitor 16 of service provider network 6 provides flow capture of network traffic associated with users 8A-8N (hereinafter, "users 8"). Service provider network 6 may be a core service provider network of the Internet, and typically includes routers (not shown) and/or other devices that forward network-based traffic between users 8 and the Internet. Users 8 are typically not directly coupled to service provider network 6, but may be part of enterprise networks, access networks, or other networks.

In one embodiment, the routers and/or other devices within service provider network transparently replicate traffic within the network, and forward the replicated traffic to network monitor 16 for monitoring and distributing based on filter criteria set by control sources (CS) 10A-10N ("CSs 10"). Alternatively, network monitor 16 may be integrated within one or more of the routers within service provider network 6 so as to provide dual functions: (1) routing of network traffic, and (2) transparent and lawful monitoring of the traffic. Other network devices in which the features may be integrated include gateways, switches, servers, workstations, or other network devices.

In general, CSs 10 may designate one or more of users 8 for network traffic monitoring and provide network monitor 16 with flow capture information 7 that provide criteria for specifying packet flows related to the designated users. CSs 10 may be located in one or more geographic locations remote from service provider network 6. Although described for exemplary purposes with respect to a core service provider network 6 within the Internet, the technique may be applied to any type of network, such as a broadband Internet service provider (ISP) network, an enterprise local area network, or any other computer-based network. For example, users 8 may be connected to service provider network 6 via respective broadband links, such as those associated with a cable or digital subscriber line (DSL) service.

CSs 10 interact with one or more dynamic flow capture (DFC) service cards of network monitor 16 to initiate dynamic flow capture of packet flows associated with one or more of users 8. Once dynamic flow capture is enabled for a designated one of users 8, the DFC service cards of network monitor 16 may replicate the data packet streams flowing between the designated user and the Internet that match the flow capture information 7 provided by one or more of CSs 10. The DFC service cards forward the copied packets 11 to one or more specified content destinations (e.g., specialized data analyzers—not shown in FIG. 1), which may reside at CSs 10, service provider network 6, or at remote locations. In one embodiment, in addition to the copied packets, the DFC service cards may forward other intercept related information (IRI), e.g., authentication details, access type, (e.g., Dial-Up, DSL, or local area network), username, user IP address, bytes transmitted, bytes received by user, and the like.

Network monitor 16 may generate traffic flow packets and transmit the traffic flow packets to packet flow collector 18. The phrase "traffic flow packet" is used herein to describe a packet having a payload that specifically includes traffic flow information. As one example, traffic flow packets may correspond to "cflowd" packets generated according to a flow analysis tool such as NetFlow™ created by Cisco Systems. Packet flow collector 18 receives traffic flow packets from network monitor 16, and stores the traffic flow information carried by the traffic flow packets within a database or other suitable data structure. In addition, packet flow collector 18 may analyze the received traffic flow packets to identify any suspicious packet flows. For example, packet flow collector 18 may identify packet flows arising from Denial of Service (DOS) attacks and other network security violations. In this manner, analysis of traffic flows through network 6 can improve network reliability and be used to reduce the potential for security breaches or other network events. In addition, network monitor 16 and packet flow collector 18 may use traffic flow analysis to improve network performance. In another embodiment, the functionality of packet flow collector 18 may reside within a service card of network monitor 16.

The DFC service cards of network monitor 16 provide real-time capture and relaying of specified network-based communications, even under high-volume traffic rates. For example, as described herein, the DFC service cards can monitor and replicate targeted network communications for high traffic rates, even core traffic rates of the Internet, including OC-3, OC-12, OC-48, OC-192, and higher rates. Moreover, the techniques described herein allow CSs 10 to tap new or existing packet flows within an extremely small period of time after specifying flow capture information, e.g., within 50 milliseconds, even under high-volume networks. Further, the techniques can readily be applied in large networks that may have one or more million of concurrent packet flows, and where hundreds of thousands of tap entries may be defined.

CSs 10 may be customers that perform micro-flow analysis. In this application, DFC service cards of network monitor 16 generate cflowd records of flows passing through network monitor 16. Packet flow collector 18 analyzes the flows for any unusual patterns to identify network events, such as Denial of Service (DoS) attacks, worm propagation, and other network security violations. As soon as such a potential threat is detected, packet flow collector 18 sends an exact flow filter to a DFC service card of network monitor 16 to capture the data packets in that flow to analyze the attack or worm signature.

As another example, CSs 10 may be Internet service providers (ISPs) that enforce policies by monitoring packets to check for disallowed content. For example, an ISP may monitor packets on an Internet relay chat (IRC) port, or may monitor for point-to-point traffic file-sharing. As yet another example, CSs 10 may be law enforcement agents that perform lawful intercept surveillance of packet-based communications as authorized by judicial or administrative order. See "NETWORK DEVICE HAVING SERVICE CARD FOR LAWFUL INTERCEPT AND MONITORING OF PACKET FLOWS," U.S. patent application Ser. No. 11/516,878, filed Sep. 7, 2006, the entire content of which is incorporated herein by reference.

CSs 10 typically provide the flow capture information to the DFC service cards of network monitor 16 via a remote flow capture protocol. In this manner, CSs 10 may selectively define the packet flows that are intercepted for analysis. Alternatively, CSs 10 or a system administrator operating under the direction of the CSs may provide the flow capture information directly, e.g., via a keyboard, mouse or other input mechanism, to control interception of packet flows.

In an example embodiment, the remote flow capture protocol may include commands for a control source to add, delete, or refresh filter criteria. An add request may include the flow capture information, including parameters such as timeouts. For example, the add request may include a "total" timeout that specifies an amount of time (e.g., in seconds) after which the filter criterion expires and is to be removed. The add request may include an "idle" timeout that specifies an amount of time (e.g., in seconds) after which, if a packet matching the criterion has not been received, the filter criterion expires. The add request may include a "packet" timeout. The packet timeout specifies a maximum number of packets that, if received without receiving any packets matching the criteria, will cause the filter criterion to expire. The add request may include a "byte" timeout. The byte timeout specifies a maximum number of bytes that, if received without receiving any packets matching the criteria, will cause the filter criterion to expire. When a timeout expires, the DFC service card 28 sends a notification to the control source that the filter criterion will be deleted. A filter criterion may be defined as "static" when added. A static criterion will remain in effect until deleted by a delete command or deleted due to congestion.

A control source may send a delete request that asks to remove a particular filter criterion (or all filter criteria) for the control source. The DFC service card 28 may send responses to the control source in response to the received requests. A control source may send refresh request to update the timeout for one or more filter criteria. For example, this request may be used to maintain as active those criteria about to expire.

As described in further detail below, techniques are disclosed for efficiently handling the large number of timeouts that must be maintained for a large number of filters. For example, the techniques may be used for managing tens of thousands of filter criteria timeouts. Although described for purposes of example with respect to managing filter criteria within a network device, the techniques of the invention may be applied as a standalone application for managing large numbers of timers in a variety of contexts. In one embodiment, a method for maintaining timers comprises defining a timeout array comprising a plurality of elements, wherein the timeout array represents a span of time and the elements represent sequential units of time receiving information specifying one or more items and a timeout associated with each of the items; and updating an element of the timeout array to identify the item, wherein the updated element represents a time unit within the span of time that corresponds to the timeout for the item.

The term "packet" is used herein to generally describe a unit of data communicated between resources in conformance with a communication protocol. The principles of the invention may be readily applied to a variety of protocols, such as the Transmission Control Protocol (TCP), the User Datagram Protocol (UDP), the Internet Protocol (IP), Asynchronous Transfer Mode (ATM), Frame Relay, and the like. Accordingly, "packet" is used to encompass any such unit of data, and may be interchanged with the term "cell," or other similar terms used in such protocols to describe a unit of data communicated between resources within the network.

Figure 2:
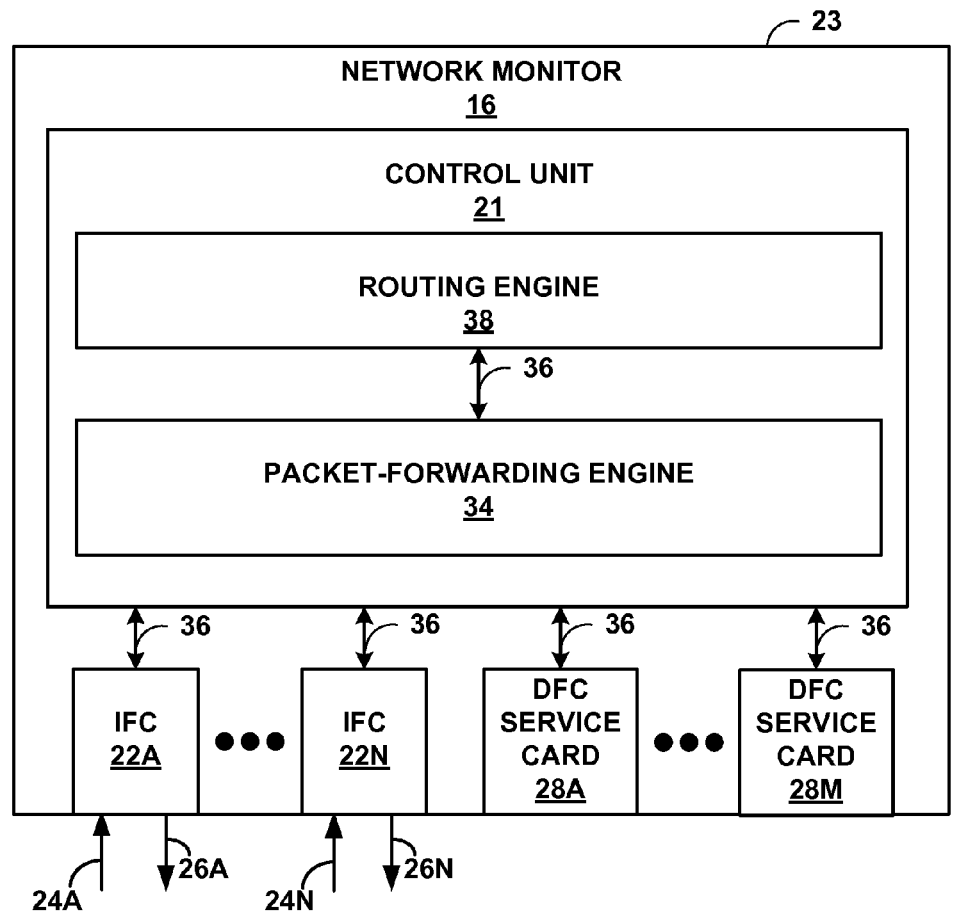
FIG. 2 is a block diagram illustrating an example embodiment of a network monitor that performs monitoring and replication of packet flows consistent with the principles of the invention.

FIG. 2 is a block diagram illustrating an example embodiment of a network monitor 16 that performs monitoring and replication of packet flows consistent with the principles of the invention. In the illustrated embodiment, network monitor 16 includes a physical chassis 23 for housing a control unit 21. Chassis 23 has a number of slots (not shown) for receiving a set of removable cards, including interface cards (IFCs) 22A-22N (collectively, "IFCs 22") and one or more DFC service cards 28A-28M (collectively, "DFC service cards 28"). Chassis 23 may receive other service cards, such as accounting service cards, encryption service cards, and tunnel service cards. Each card may be inserted into a corresponding slot of chassis 23 for electrically coupling the card to control unit 21 via a bus, backplane, or other electrical communication mechanism.

IFCs 22 send and receive packet flows via inbound network links 24A-24N (collectively, "inbound network links 24") and outbound network links 26A-26N (collectively, "outbound network links 26"), respectively. IFCs 22 and service cards 28 are connected with packet forwarding engine 34 by internal links 36. Links 36 may comprise any form of communication path, such as electrical paths within an integrated circuit, data busses, optical links, network connections, wireless connections, or other type of communication path. Although not shown in the embodiment of FIG. 2, DFC service cards 28 may also include interface ports for direct coupling to network links.

In one embodiment, network monitor 16 includes a routing engine 38 that maintains routing information that describes the topology of service provider network 6. Routing engine 38 analyzes stored routing information and generates forwarding information stored within packet forwarding engine 34 for forwarding packets received via inbound links 24 to next hops. In order to maintain an accurate representation of the network, network monitor 16 may support a number of protocols for exchanging routing information with other routers. For example, network monitor 16 may support the Border Gateway Protocol (BGP), for exchanging routing information with routers of other autonomous systems. Similarly, network monitor 16 may support the Intermediate System to Intermediate System protocol (IS-IS), which is an interior gateway routing protocol for communicating link-state information within an autonomous system. Other examples of interior routing protocols include the Open Shortest Path First (OSPF), and the Routing Information Protocol (RIP).

Routing engine 38 directs packet-forwarding engine 34 to maintain forwarding information in accordance with the routing information. The forwarding information may, therefore, be thought of as a subset of the information contained within the routing information. In particular, forwarding information associates packet information, referred to as a "key," with specific forwarding next hops (FNH). A FNH generally refers to a neighboring router physically coupled to a source router along a given route. For example, the FNH for a route may specify a physical interface and media access control (MAC) address for the interface associated with the router. Packet-forwarding engine 34 controls the flow of packets through network monitor 16 in order to integrate routing and forwarding functionality with dynamic flow capture functionality. In this manner, network monitor 16 may integrate active routing functionality with dynamic flow capture functionality provided by DFC service cards 28. Alternatively, network monitor 16 may be a passive monitor in that packet forwarding engine 34 may direct all inbound traffic received via IFCs 22 to DFC service cards 28 without forwarding the traffic to next hops.

In one embodiment, each of packet-forwarding engine 34 and routing engine 38 may comprise one or more dedicated processors, hardware, and the like, and may be communicatively coupled by data communication channel 36. Data communication channel 36 may be a high-speed network connection, bus, shared-memory or other data communication mechanism.

As further described below, DFC service cards 28 each include one or more modules that receive packets from packet forwarding engine 34 of control unit 21, associate the packets with packet flows and detect any packet flows matching flow capture information provided by CSs 10. Packet forwarding engine 34 performs inline duplication of some or all of the packets to be forwarded, and passes the duplicated packets to one or more DFC service cards 28 for packet flow matching. In one embodiment, DFC service cards 28 then inject the matching packets into packet forwarding engine 34 for forwarding to content destinations (CDs) specified by CSs 10. Alternatively, as a passive monitor, DFC service cards 28 drop the matching packet. In either case, packet forwarding engine 34 forwards the original packets in conventional fashion via interface cards 22 in accordance with the forwarding information.

Each DFC service card 28 may include one or more microprocessors, field-programmable gate arrays (FPGAs), application-specific integrated circuits (ASICs), or other components that provide an operating environment for software or firmware. As described, control unit 21 distributes replicated packets to DFC service cards 28 for detection of packet flows that match flow capture information. In one embodiment, control unit 21 distributes the packets of a common flow to a common DFC service card 28.

In one embodiment, control unit 21 applies a hashing function to at least a portion of the header for each packet to ensure that packet flows are distributed across DFC service cards 28, and that packets of a packet flow are distributed to a common one of the DFC service cards 28. Control unit 21 may apply a hashing function to at least one of a source network address, a destination network address, and a communication protocol for the packet. Control unit 21 may apply the hashing function to header information with each packet to generate a hash value, and distribute each packet to one of the DFC service cards 28 based on the calculated hash values. Furthermore, portions of the header information may be selected to cause packet fragments associated with a common one of the network packet to be distributed to a common one of the DFC service cards 28. For example, layer 4 port information may be ignored, which may not be present for packet fragments.

Multiple DFC service cards 28 may be added to easily scale network monitor 16 to support dynamic flow capture for higher bandwidth communication links coupled to IFCs 22. For example, depending upon processing power, two DFC service cards 28 may be used to provide real-time monitoring and dynamic flow capture for a single OC-3 communication link, while four cards and sixteen cards may be used for OC-12 and OC-48 links, respectively. As another example, eight DFC service cards 28 may be used to monitor and provide lawful intercept for four OC-3 links. Additional DFC service cards 28 may be used for purposes of redundancy to support continuous, uninterrupted packet processing and lawful intercept in the event of card failure.

Figure 3:
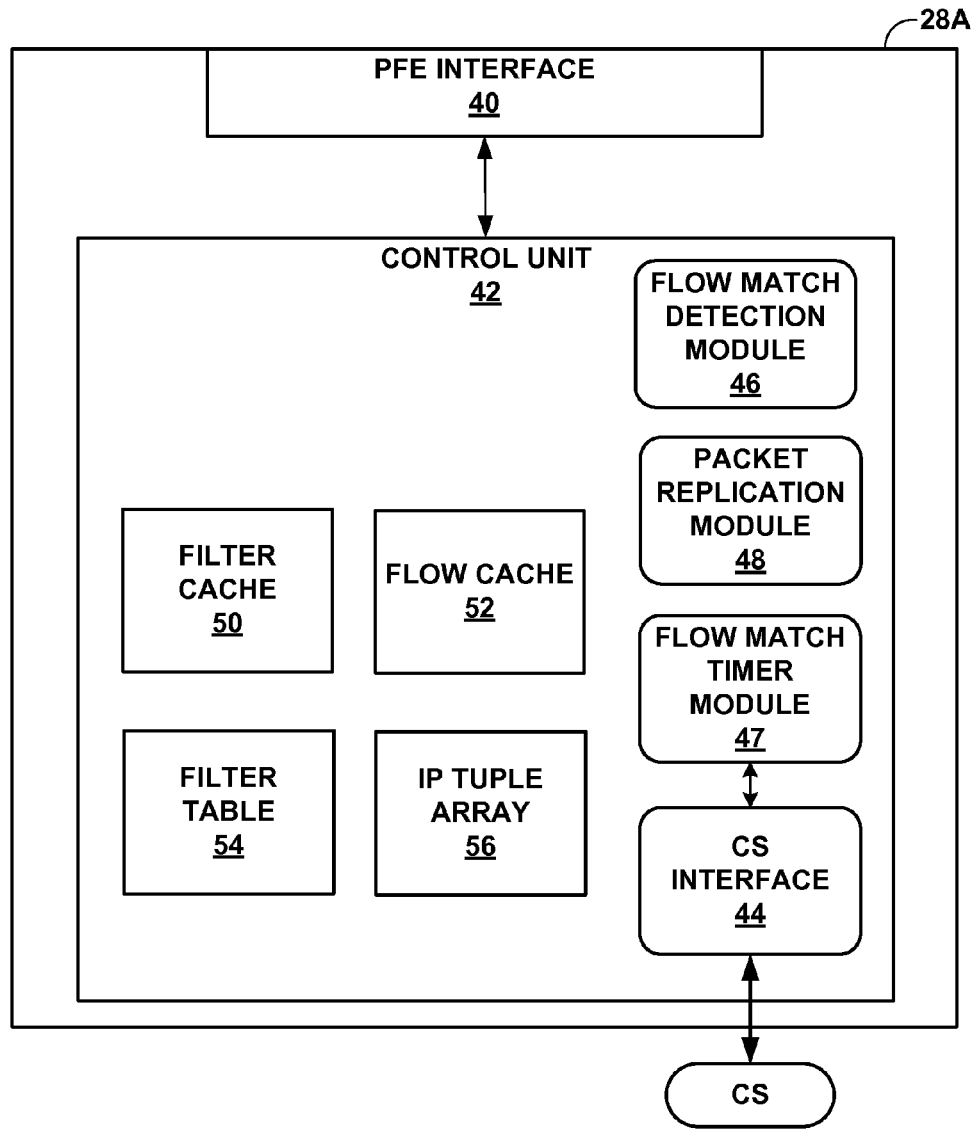
FIG. 3 is a block diagram illustrating an example embodiment of a service card that performs packet flow monitoring and forwarding in accordance with the principles of the invention.

FIG. 3 is a block diagram illustrating one example embodiment of DFC service card 28A of network monitor 16 that performs dynamic packet flow monitoring and forwarding in accordance with the principles of the invention. DFC service card 28A includes a packet forwarding engine interface 40 ("PFE interface 40") for communicating with PFE 34 (FIG. 2). PFE interface 40 may be an electrical interface. DFC service card 28A receives packets via PFE interface 40, and also forwards packets that match stored flow capture information to the appropriate content destinations via PFE interface 40.

DFC service card 28A also includes a control unit 42. Control unit 42 provides an operating environment for a control source (CS) interface 44 (e.g., a software communication protocol) that allows a CS to convey flow capture information to DFC service card 28A. Flow capture information may take the form of a filter, and may comprise criteria for matching one or more flows, such as source internet protocol (IP) address, destination IP address, source port, destination port, and protocol. The flow capture information may also include a content destination to which to send a copied packet flow that matches the particular filter criteria.

When DFC service card 28A receives a packet via PFE interface 40, flow match detection module 46 determines whether the packet matches any of the filters defined by the stored flow capture information, as will be described in further detail below. When the packet matches the flow capture information, control unit 42 may cause the packet to be sent to the appropriate content destination via PFE interface 40 and PFE 34, which outputs the packet via one of IFCs 22. In the case where the packet must be sent to more than one content destination, packet replication module 48 may form the appropriate number of copies of the packet having the appropriate destination information within the packet header to effectively direct the packets to the corresponding destinations specified by the flow capture information. In embodiments in which network monitor 16 is a passive monitor, DFC service card 28A drops the replicated packets after detecting flow matches, and may store flow match information or statistics for later analysis.

In support of dynamic flow capture of high-volume network traffic, control unit 42 includes a number of unique data structures, such as filter cache 50, flow cache 52, filter table 54, and IP tuple array 56. When a CS 10 provides flow capture information in the form of one or more filters, control unit 42 stores the recently received flow capture information in filter cache 50. CS interface 44 may also communicate the received flow capture information to any other DFC service cards 28 via PFE interface 40, or via a direct connection between the DFC service cards 28 without going through PFE 34. As a result, additional DFC service cards 28 can be used to intercept packets using the same flow capture information, thereby facilitating a scalable system able to support high data rates. After a time period, control unit 42 moves the recently received flow capture information from filter cache 50 to filter table 54. Filter table 54 thus stores all of the flow capture information, except for the most recent flow capture information (e.g., filters) recently received within the specified time period, i.e., active flow capture information. Control unit 42 may maintain filter table 54 and filter cache 50 in the form of one or more tables, databases, link lists, radix trees, tries, flat files, or any other data structures.

IP tuple array 56 is an array having a range of source IP addresses as one dimension and a range of destination IP addresses as another dimension. In one embodiment, the array is divided into bins (addressable elements), each bin representing ranges of 1000 by 1000 addresses along the dimensions. In one embodiment, when control unit 42 moves recently received flow capture information from filter cache 50 to filter table 54, control unit 42 increments a reference count in the appropriate bin based on the source and destination IP addresses specified the flow capture information. In this way, control unit 42 maintains a general representation of where within the IP address space CSs 10 have defined flow capture information. IP tuple array 56 may be used as a mechanism for quickly dropping unmonitored packets to save computational resources, and will be described in further detail below.

When flow match detection module 46 first determines that a newly received or current packet flow matches some of the flow capture information, control unit 42 stores the matching portion of the flow capture information (e.g., one or more filters matching the packet flow) in a flow cache 52. When processing subsequent packets, flow match detection module 46 may quickly look at the appropriate entry within flow cache 52 for a recent match before accessing filter table 54, which may be quite large (e.g., tens of thousands of filters). In this manner, packets from previously matched flows can be processed more quickly, and a time-consuming lookup of filter table 54 may be avoided.

DFC service card 28A also includes a flow match timer module 47 that handles the timeouts associated with the filter criteria received from CSs 10 via CS interface 44. Flow match timer module 47 maintains one more timeout data structures, and updates or deletes filter criteria entries stored in filter table 54, as described in further detail below.

Figure 4A:
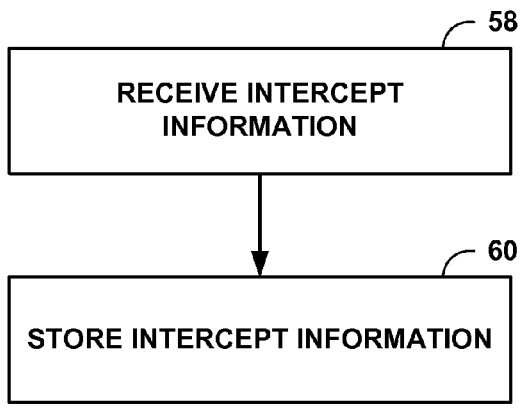
FIGS. 4A-4B are flowcharts illustrating example operation of a service card performing packet flow monitoring and forwarding.
Figure 4B:
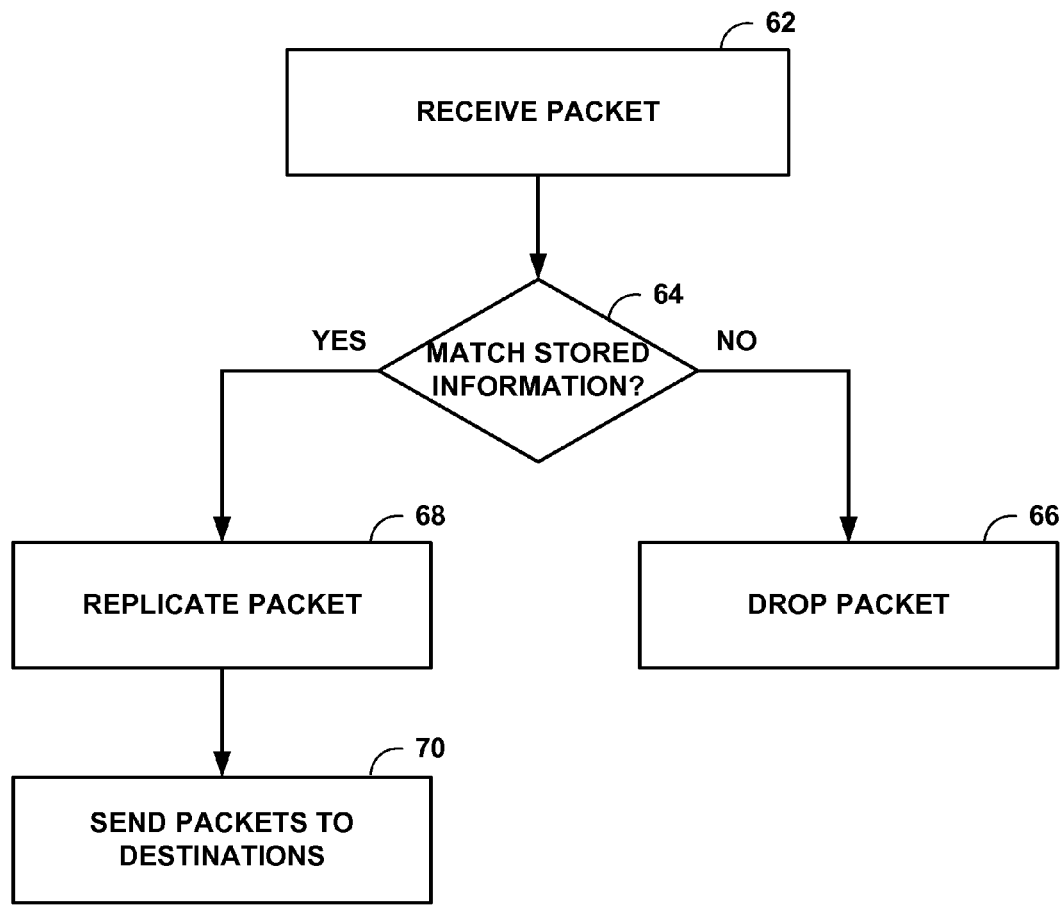

FIGS. 4A-4B are flowcharts illustrating an overview of example operation of an DFC service card 28A of network monitor 16 performing packet flow monitoring and forwarding of packet flows. As shown in FIG. 4A, in this example, DFC service card 28A receives flow capture information entered by a CS 10 via CS interface 44 (FIG. 3) (58). DFC service card 28A stores the received flow capture information in filter cache 50 (60). DFC service card 28A may also share the received flow capture information with other DFC service cards 28 in network monitor 16, and receive and store flow capture information from other DFC service cards 28.

As illustrated in FIG. 4B, when DFC service card 28A receives a packet via PFE interface 40 (62), DFC service card 28A uses flow detection module 46 to determine whether the packet matches any of the stored flow capture information by referencing the data structures within control unit 42 (64).

The process of determining whether the packet matches flow capture information is described below. When the packet does not match any of the flow capture information, DFC service card 28A drops the packet (66). When the packet matches some of the flow capture information, and the flow capture information requires that copies of the packet be sent to more than one destination, packet replication module 48 of DFC service card 28A replicates the packet (68). In any case, DFC service card 28A sends one or more copies of the packet to the one or more destinations specified by the flow capture information (70). DFC service card 28A may receive and store flow capture information, as illustrated in FIG. 4A, concurrently with monitoring and forwarding packets, as illustrated in FIG. 4B.

FIG. 5 is a block diagram illustrating an exemplary filter table 54 maintained by DFC service card 28A for performing packet flow monitoring and forwarding. Filter table 32 stores flow capture information received by DFC service card 28A. In the example shown in FIG. 5, filter table 32 organizes the flow capture information in rows of entries, where each entry represents a different filter criterion received from one of CSs 10. A criteria identifier column 72 includes a unique identifier for each entry.

In this example, a 5-tuple criteria column 74 is used to specify zero or more of a source IP address, destination IP address, source port, destination port, and protocol. A CS 10 interacts with the DFC service card 28 via the CS interface 44, and specifies the flow capture information to obtain copies of any packet flows that match the 5-tuple criteria. An add/refresh timestamp column 73 specifies the time the filter criterion was added or refreshed. A traffic timestamp column 75 specifies the most recent time that traffic (i.e., a packet) was received that matched the criteria. A total timeout column 76 specifies a total timeout, in seconds, which represents the total amount of time after which the filter criterion will expire. An idle timeout column 77 specifies an idle timeout, in seconds, which represents the amount of time after which, if a packet matching the filter criterion has not been received, the filter criterion will expire. A packet timeout column 78 specifies a packet timeout, in number of packets, which represents the number of packets which, if received before receiving a packet matching the filter criterion, will cause the filter criterion to expire. A byte timeout column 80 specifies a byte timeout, in number of bytes, which represents the number of bytes which, if received before receiving a packet matching the filter criterion, will cause the filter criterion to expire.

Filter table 54 may also include a control source column (not shown) that specifies the source of the flow capture information, i.e., which CS 10 may enter along with the flow capture information. Filter table 54 may further include a content destination column (not shown) that specifies the destination to which packets matching the 5-tuple criteria should be sent. The control source and content destinations may be designated by an IP address or by a user-configured character string. In the example of FIG. 5, the filter criterion corresponding to entry A indicates that copies of packets having a source IP address S1, a destination IP address D1, a source port 80, and a destination port 80, and using the HTTP protocol, should be sent to content destination CS1, which is the same as the control source CS1 that sent the entry. Entry A was added at 11:45:59, and will expire after 86,400 seconds (24 hours) if not refreshed. Entry A will expire if no matching packets are received within 300 seconds (5 minutes), within receiving 5,000 packets, or within receiving 100,000 bytes. A packet matching entry A was received most recently at 08:01:35. Traffic timestamp column 75 indicates that no packets matching entry C have yet been received. If no packets are received in one hour from the add/refresh time, entry C will be deleted from filter table 54.

In some examples, the CS may specify one or more of the 5-tuple criteria as a wildcard. For example, in entry C, the CS wants to receive copies of any packets from source IP address S2, regardless of the destination IP address. As another example, in entry B, the CS wants to receive copies of any packets sent to destination IP address D2, regardless of the source IP address. As a further example, a CS may specify all of the 5-tuple criteria as wildcards, to monitor any-to-any traffic across the network. Filter table 54 may store all of the flow capture information received by DFC service card 28A, except for that flow capture information received more recently than a given time before the current time. For example, filter table 54 may store all received flow capture information except for that flow capture information received within the last 30 seconds. Any flow capture information received in the last 30 seconds is stored within filter cache 50. In some embodiments in which DFC service card 28A does not use a filter cache 50, filter table 54 may store all of the flow capture information received by DFC service card 28A.

FIG. 6 is a block diagram illustrating an exemplary filter cache 50 maintained by DFC service card 28A for performing dynamic packet flow monitoring and forwarding. Similar to filter table 32, in this example, filter cache 50 organizes the flow capture information in rows of entries, where each entry represents a different filter received from one of CSs 10. A criteria identifier column 82 includes a unique identifier (e.g., label) for each entry, and a 5-tuple criteria column 84 includes one or more of a source IP address, destination IP address, source port, destination port, and protocol. A control source column 86 and content destination column 88 specify the source of the flow capture information and the destination to which packets matching the 5-tuple criteria should be sent, respectively. Add time column 90 contains a timestamp of the time that the entry was added to filter cache 50. Filter cache 50 may include additional columns not shown, such as the timeout columns 76-80 shown in FIG. 5. Filter cache 50 may store all flow capture information received recently, such as all flow capture information received by DFC service card 28A in the last 30 seconds. Once an entry has been stored in filter cache 50 for more than a specified time (e.g., 30 seconds), control unit 42 flushes the entry by moving the entry from filter cache 50 to filter table 54. Control unit 42 may determine that an entry is more than 30 seconds old by executing a background software task or process that compares the specified add time for each entry to the current time.

Filter cache 50 may have a limited amount of storage space, such as 30 entries. If DFC service card 28A receives more than one entry per second, control unit 42 may move entries to filter table 54 sooner than 30 seconds (i.e., the specified caching period in this example) from receipt when filter cache 50 reaches 30 entries.

FIG. 7 is a block diagram illustrating an exemplary flow cache 52 maintained by DFC service card 28A that indicates whether packet flows F1-Fn have been recently matched to the filter criteria specified in either filter cache 50 or filter table 54. In one embodiment, flow cache 52 is maintained as a hash table, where the hash value used to index the hash table is computed from packet header data. For example, flow hash column 92 contains flow hash values that operate as indexes for the corresponding row. When DFC service card 28A receives a packet, control unit 42 calculates a flow hash based on information contained in a header of the packet. Control unit 42 uses the flow hash as an index into flow cache 52. As explained in further detail below, control unit 42 populates entries of flow cache 50 when flow match detection module 46 accesses filter cache 50 or filter table 54 to determine whether a received packet matches the criteria of one or more flow capture information entries. Control unit 42 updates an entry of flow cache 52 for every received packet to record, either positively or in the negative, whether or not the packet matches any flow capture information.

In this example, matching criteria column 94 contains the criteria identifier for the entry or entries of filter cache 50 or filter table 54 that flow match detection module 46 has recently determined match the packet of a given flow F, along with a flow identifier. For example, the entry of flow cache 52 corresponding to hash value H172 shows that the packets of flow F2 match entry A of filter table 54. In this way, flow match detection module 46 can check flow cache 52 first to see whether flow cache 52 has a matching entry for the packet. If so, flow match detection module 46 can go directly to the entry of filter table 54 listed in matching criteria column 94, instead of having to traverse filter table 54 in its entirety. As flow cache 52 is implemented as a hash table or other suitably fast access data structure, fast determination of any matching filters can be identified without requiring potentially time-consuming traversal of filter table 54 for each packets. As a result, high data rates can be achieved.

Expiration time column 96 (EXP. TIME 96) contains an expiration time. The expiration time indicates the time at which the corresponding entry of flow cache 52 is to be flushed, provided no additional packets for the flow are received prior to the expiration time. Timer duration column 98 specifies the amount of time, i.e., the length of time to be used for expiration and flushing of the entry by control unit 42. Control unit 42 uses the expiration time and the timer duration to ensure both that flow cache 52 does not grow too big, and to prevent flow cache 52 from containing information that is out-of-date with respect to filter table 54. First, whenever a packet is received for a flow listed in matching criteria column 94 of flow cache 52, control unit 42 resets the corresponding expiration time according to the time duration. This ensures that flows that are still active within the expiration time are not flushed. For example, if a packet were received at 23:40:03 for the flow listed in H172, control unit 42 would reset the expiration time to 28:40:03, i.e., five minutes from the current time. If the time 28:40:03 were reached without interface card 28A receiving another packet for H172, control unit 42 would flush entry H172 by clearing the matching entries.

Second, whenever control unit 42 adds an entry to filter cache 50 that is matched by a flow listed in flow cache 50, control unit 42 changes the timer duration in all entries of flow cache 52 from a first timer duration to a second timer duration, e.g., from five minutes to thirty seconds. The second timer duration may correspond to the maximum amount of time that a flow capture information entry may be cached in filter cache 50 before being moved to filter table 54. When the corresponding entry in filter cache 50 has been moved from filter cache 50 to filter table 54, all entries in flow cache 52 will have been flushed, and when a subsequent packet for a flow is received, flow match detection module 46 will not get out-of-date information from flow cache 52. Instead, flow match detection module 46 will see that there is no entry in flow cache 52 that matches the flow, and will move on to check filter table 54, where the flow capture information entry has been moved.

A packet may match more than one entry of filter table 54, as illustrated by the entry of flow cache 52 corresponding to hash value H105. In this entry of flow cache 52, F1 matches both entries A and B of filter table 54. In some cases, more than one flow may hash to the same hash value. For example, the entry of flow cache 52 corresponding to hash value H105 contains two different matching entries. In this case, both flow F1 and flow F4 hash to the same value H105, and match different entries of filter table 54. Further, an entry in flow cache 52 may be a null entry; that is, the entry may reflect that a flow has recently been hashed to that entry, and the flow does not match any of the entries in filter table 54. An example of this is the entry of flow cache 52 corresponding to hash value H30.

Figure 8:
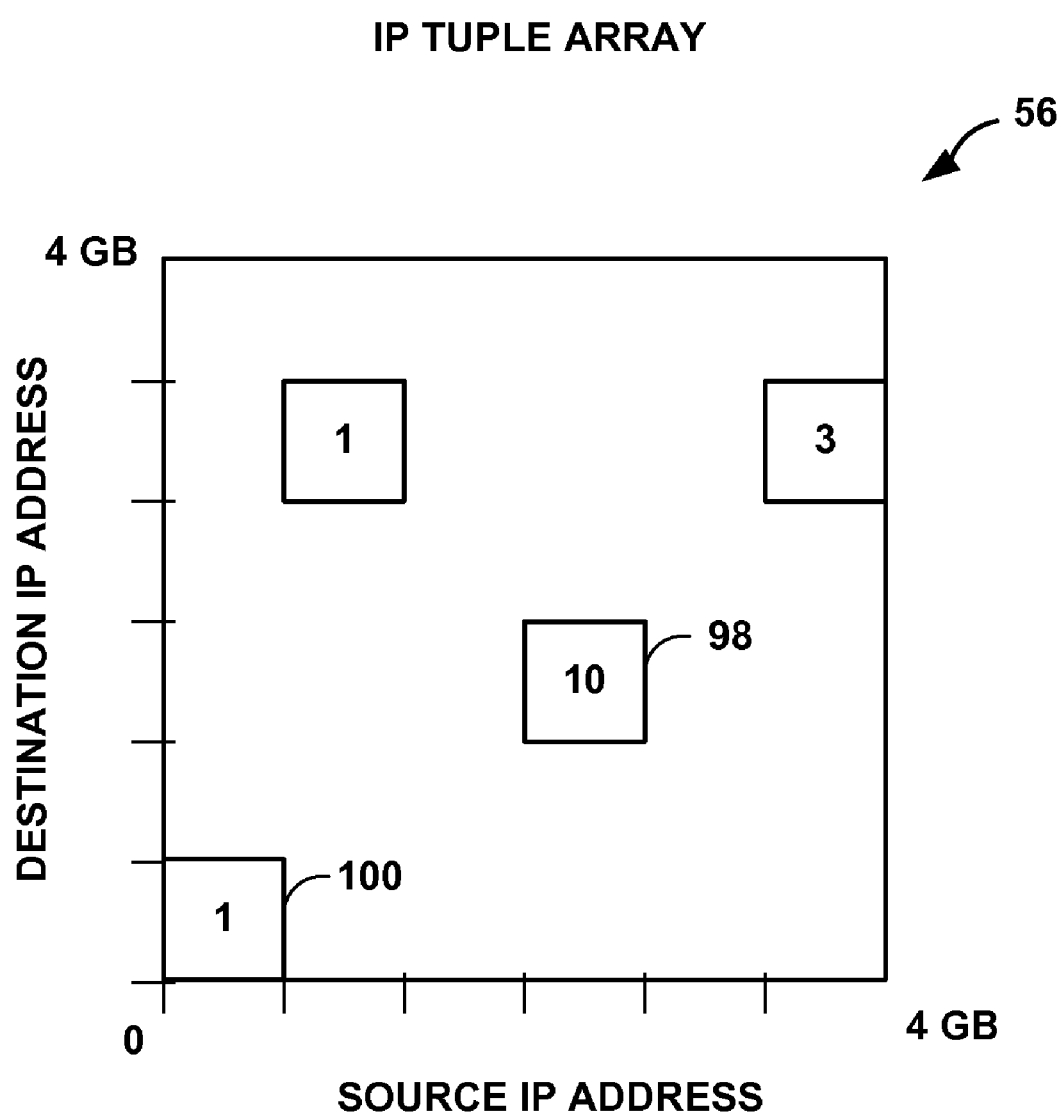
FIG. 8 is a block diagram illustrating an exemplary IP tuple array data structure maintained by the service card.

FIG. 8 is a block diagram illustrating an exemplary IP tuple array 56 maintained by DFC service card 28A for performing packet flow monitoring and forwarding. IP tuple array 56 is an array of reference counts having a range of source IP addresses as one dimension and a range of destination IP addresses as another dimension. In one embodiment, the array is divided into bins (entries) that are indexed by ranges of 1000 by 1000 addresses along each dimension. Control unit 42 increments a reference count (i.e., index) associated with the appropriate bin of IP tuple array 56 each time control unit 42 moves an flow capture information entry from filter cache 50 to filter table 54. For example, the reference count associated with bin 98 has been incremented ten times, while the reference count associated with bin 100 has been incremented once. In the example of FIG. 8, the bins not called out have reference counts of zero. Thus, any given bin having a non-zero reference count indicates that at least one entry exists in filter table 54 having criteria that specify source and destination addresses within the addresses ranges associated with the bin. In this way, control unit 42 maintains a general representation of where in the IP address space CSs 10 have specified flow capture information.

Flow match detection module 46 may consult IP tuple array 56 before looking up a packet in filter table 54. IP tuple array 56 may be somewhat sparsely populated. In some embodiments, the dimensions of IP tuple array 56 may have different levels of granularity. A large number of packets received by DFC service card 28A will likely not match any of the stored flow capture information. Flow match detection module 46 may use IP tuple array 56 to drop those packets for which DFC service card 28A does not have any flow capture information, without needing to traverse the entire filter table 54. As a result, the use of IP tuple array 56 may reduce the processing time of DFC service card 28A.

When an entry being moved to filter table 54 contains a wildcard, such as entry C of filter table 54 (FIG. 5), control unit 42 may increment multiple bins of IP tuple array 56 for a single entry of filter table 54. In the example of entry C of filter table 54, each of the bins corresponding to source IP address S2 would be incremented, because a packet having source IP address S2 and any destination address would match entry C.

Figure 9:
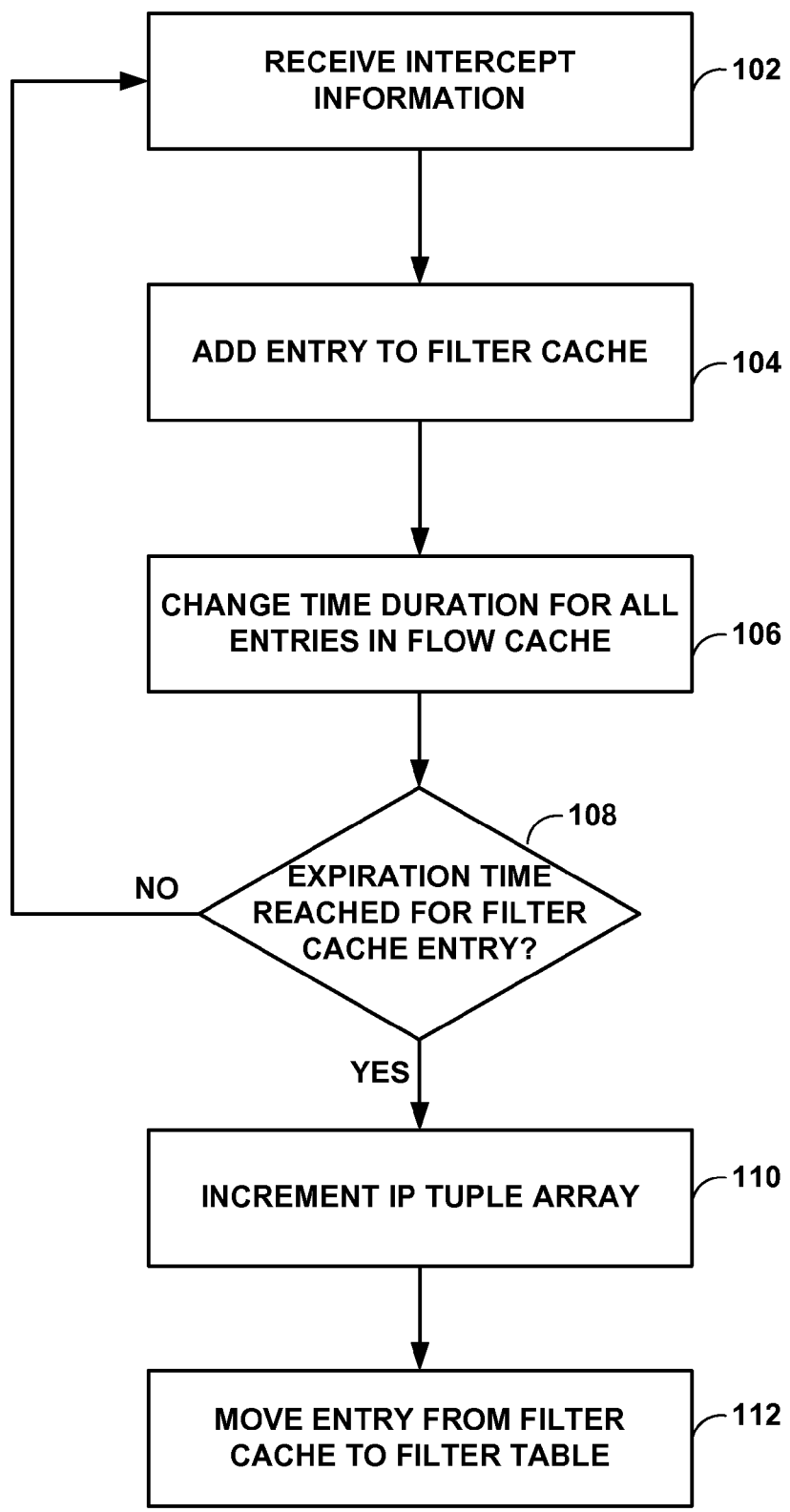
FIG. 9 is a flowchart illustrating example operation of a service card in receiving and storing flow capture information in the form of packet flow filters.

FIG. 9 is a flowchart illustrating in more detail exemplary operation of DFC service card 28A in receiving and storing flow capture information from CSs 10. DFC service card 28A receives flow capture information via CS interface 44 (FIG. 3) (102). DFC service card 28A first adds an entry for the flow capture information to filter cache 50 (104). In addition, since an entry is present in filter cache 50, control unit 42 of DFC service card 28A changes the time duration from a first time duration to a time duration for all entries in flow cache 52 (106). For example, in one embodiment control unit 42 reduces the time duration from five minutes to thirty seconds, where thirty seconds is specified as the time duration that an entry may be cached within filter cache 50. When control unit 42 determines that the expiration time has been reached for an entry of filter cache 50 by comparing the expiration time to the current time (108), control unit 42 increments IP tuple array 56 (110) and moves the entry from filter cache 50 to filter table 54 (112).

Figure 10:
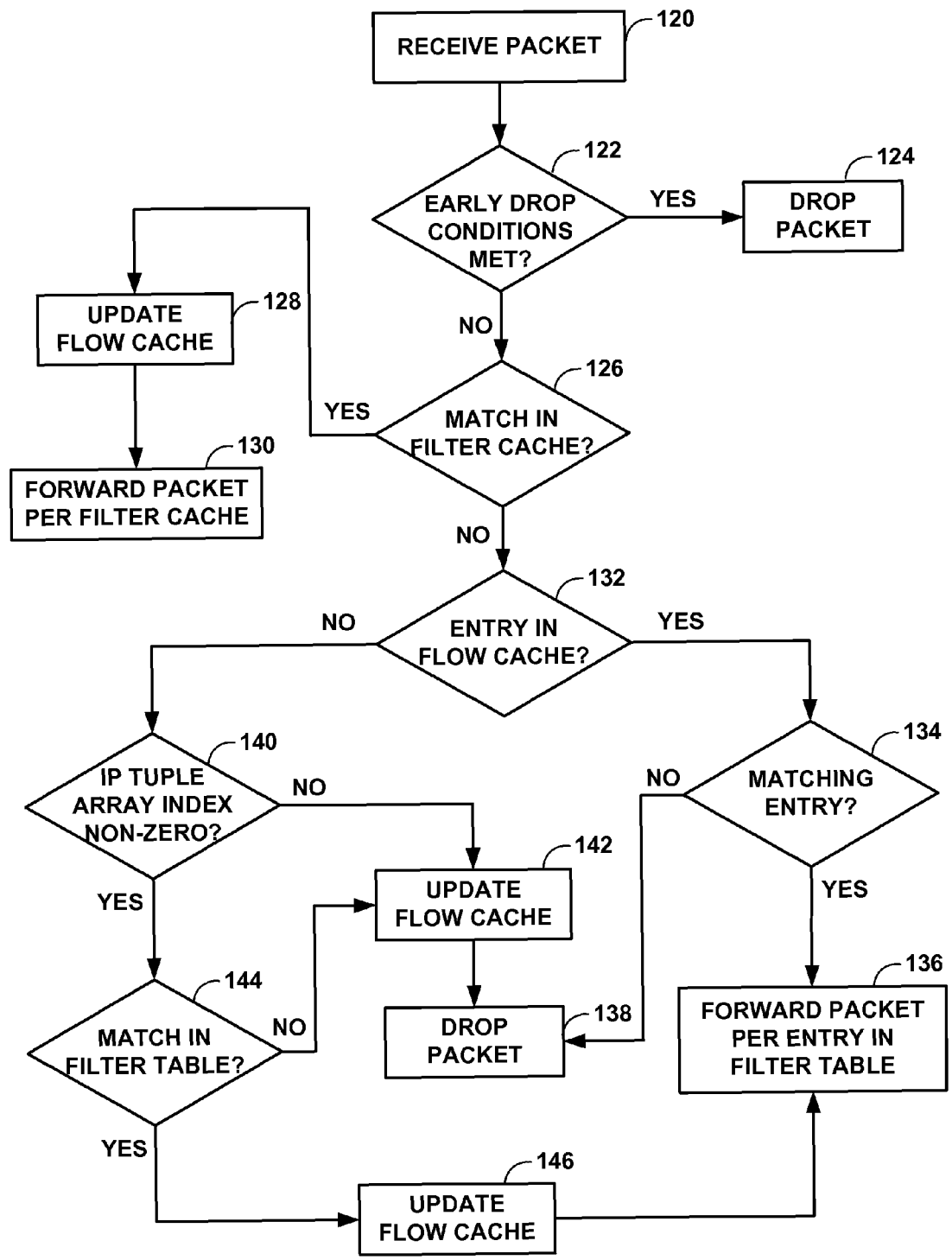
FIG. 10 is a flowchart illustrating example operation of the service card in further detail.

FIG. 10 is a flowchart illustrating in more detail exemplary operation of DFC service card 28A performing packet flow monitoring and forwarding consistent with the principles of the invention. DFC service card 28A receives a packet via PFE interface 40 (FIG. 3) (120). In some embodiments, flow match detection module 46 of control unit 42 first determines whether a set of early drop conditions is met (122). Example early drop conditions are that there are currently no entries in filter cache 50, and that the hash bucket corresponding to the packet includes a single matching entry that indicates no match (a "null entry"). If flow match detection module 46 determines that both conditions are met, control unit 42 drops the packet (124). If any of the conditions are not met, for example, filter cache 50 currently contains entries; there are multiple entries for the hash value in flow cache 52; or there is no information at all in flow cache 52 for this hash value, then flow match detection module 46 proceeds.

Where early drop conditions are not met, flow match detection module 46 determines whether the packet matches any entry in filter cache 50 (126). Flow match detection module 46 compares the packet to the 5-tuple criteria of each entry in filter cache 50. If flow match detection module 46 detects one or more matches, control unit 42 updates flow cache 52 by populating the matching criteria column 94 (FIG. 7) of the entry for the flow hash value (128). Control unit 42 forwards copies of the packet to the destination(s) specified by the matching entry in filter cache 50, with appropriate consultation of forwarding information to determine next hops (130).

Where no match is found in filter cache 50, flow match detection module 46 determines whether an entry for the packet exists in flow cache 52 (132). To do this, flow match detection module 46 calculates the hash value for the packet based on information within the header of the packet, and accesses the bin of flow cache 50 that corresponds to the calculated hash value. If a matching entry exists in flow cache 50 (YES branch of 134), flow match detection module 46 accesses the one or more entries of filter table 54 indicated by the matching entry of flow cache 50, and forwards the packet according to the flow capture information in filter table 54 (136). If there are multiple matches to the packet and the flow capture information indicates packets are to be sent to different content destinations, packet replication module 48 replicates the packet, and control unit 42 forwards one of the replicated packets to each of the appropriate destinations. Where an entry exists in flow cache 52 but the entry indicates there is no match, i.e., a null entry (NO branch of 134), control unit 42 drops the packet (138).

Where no entry exists in flow cache 52 (i.e., a cache miss), flow match detection module 46 checks the packet against IP tuple array 56 (140). In particular, flow match detection module 46 accesses the bin (element) corresponding to the source and destination IP addresses of the packet. If the index (reference count) of the bin is zero, this indicates that DFC service card 28A does not have flow capture information for the ranges of IP addresses that cover the particular IP addresses of the packet. Control unit 42 updates the entry of flow cache 52 to reflect that no match was found for this flow (142), and drops the packet (138), thereby avoiding traversing filter table 54.

Where the index of the bin of IP tuple array 56 is non-zero, flow match detection module 46 proceeds to determine whether the packet matches any entry in filter table 54 (144). Flow match detection module 46 checks the packet against each entry in filter table 54. If no match is found, control unit 42 updates the entry of flow cache 52 to reflect that no match was found for this flow (142), and drops the packet (138). If the packet matches one or more entries of filter table 54, control unit 42 updates the entry of flow cache 52 to reflect that the flow matches the entries (146). Control unit 42 then forwards the packet according to the flow capture information in filter table 54 (136). If there are multiple matches to the packet and the flow capture information indicates packets are to be sent to different content destinations, packet replication module 48 replicates the packet, and control unit 42 forwards the packets to the appropriate destinations. In addition to the copied packets, the DFC service cards may forward intercept related information (IRI), e.g., authentication details, access type, (e.g., Dial-Up, DSL, or local area network), username, user IP address, bytes transmitted, bytes received by user, and the like. These techniques allow network monitor 16 to transmit copies of the matching packet flows within an extremely small period of time after specifying flow capture information, e.g., within 50 milliseconds.

Figure 11:
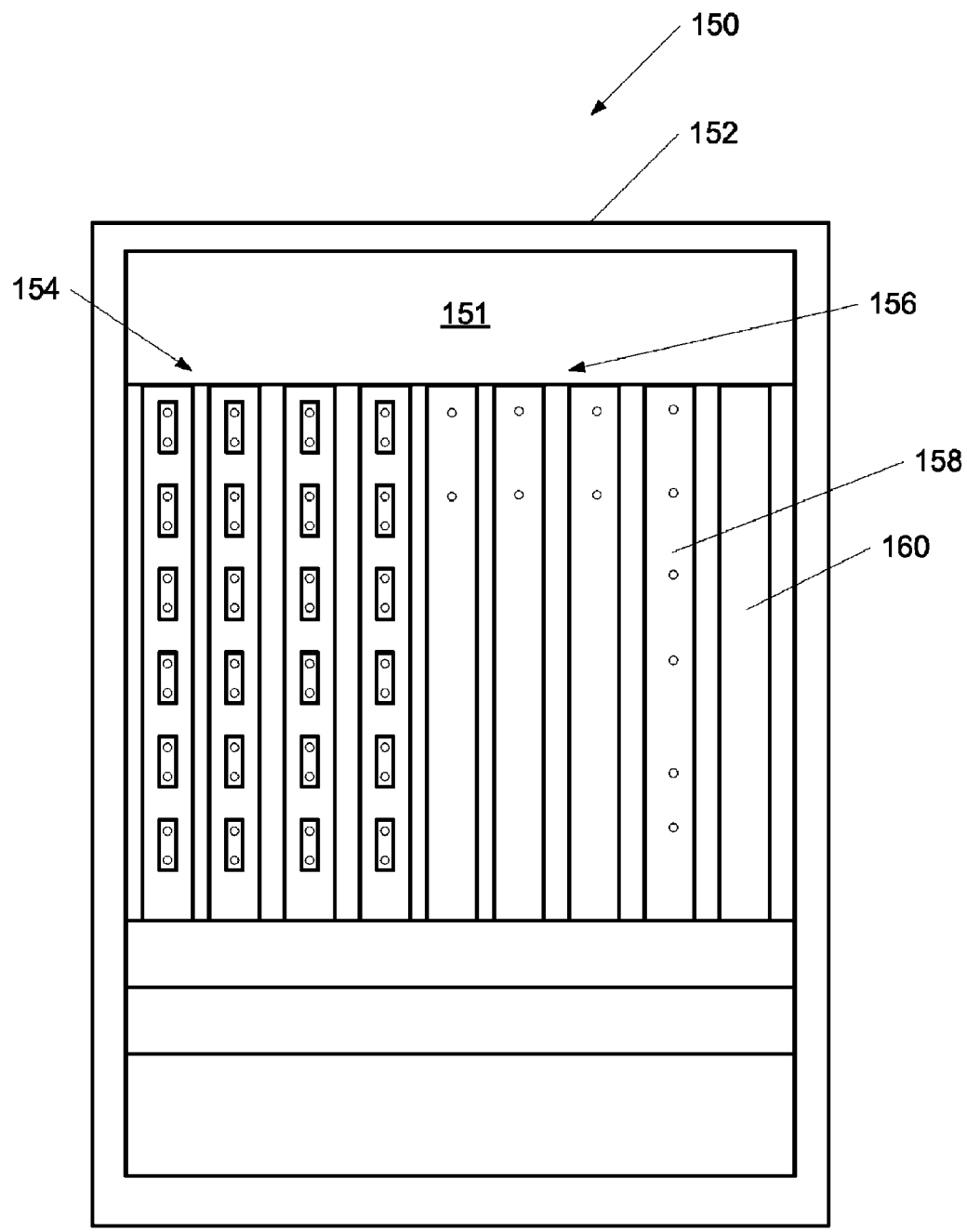
FIG. 11 is a schematic diagram illustrating an exemplary embodiment of a network router that provides dynamic flow capture features and integrates routing functionality.

FIG. 11 is a schematic diagram illustrating an exemplary embodiment of a network router 150 that provides dynamic flow capture features and, in this example, integrates routing functionality. In the illustrated embodiment, network router 150 includes a chassis 152 for housing control unit 151 having a routing engine and a packet forwarding engine (not shown). In the illustrated example, chassis 152 has nine slots for receiving a set of cards. In particular, chassis 152 receives four interface cards (IFCs) 154, three DFC service cards 156, an encryption service card 158, and a tunnel service card 160. Each card may be inserted into a corresponding slot of chassis 152 for electrically coupling the card to control unit 151 via a bus, backplane, or other electrical communication mechanism. Interface cards 154 include ports for coupling to communication links.

Figure 12:
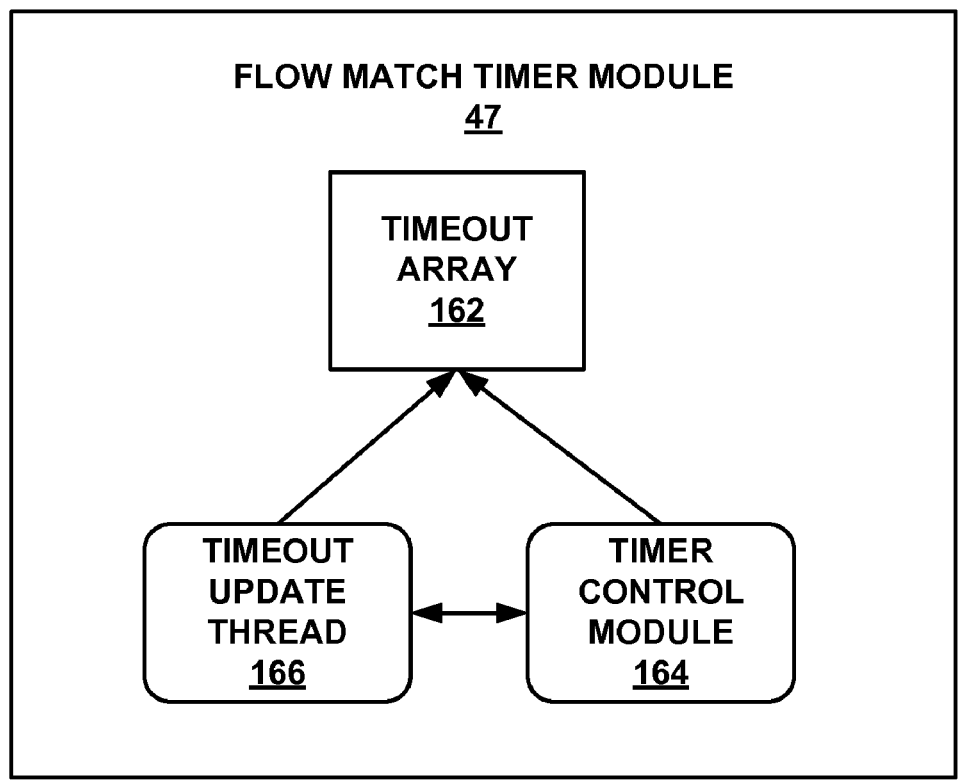
FIG. 12 is a block diagram illustrating an exemplary flow match timer module that manages filter criteria timeouts in further detail.

FIG. 12 is a block diagram illustrating in further detail an exemplary flow match timer module 47 that manages filter criteria timeouts. In this example, flow match timer module 47 maintains a timeout array 162. The timeout array 162 represents a span of time. That is, timeout array 162 comprises a plurality of elements (also referred to as "timeslots"), with each element representing a unit of time. In one example embodiment, timeout array 162 is a circular array that includes an element (timeslot) for each second in a twenty-four hour period (i.e., 86,400 timeslots). In one embodiment, flow match timer module 47 resides in user space outside of an operating system executing on DFC service card 28. When DFC service card 28A (FIG. 3) receives a timer-related command, timer control module 164 updates timeout array 162.

For example, in response to an add request from a CS 10 via CS interface 44, flow match timer module 47 checks whether the add request defines a total timeout and/or an idle timeout. If a timeout is defined, timer control module 164 updates timeout array 162 to include, at the timeslot corresponding to the timeout time, a pointer to the location of the corresponding filter criteria entry in filter table 54. When DFC service card 28A receives a refresh request from CS 10 that updates a timeout for an active filter criterion, DFC service card 28A updates the add/refresh timestamp of the corresponding entry in filter table 54. As another example, timer control module 164 may update timeout array 162 when DFC service card 28A moves a filter criterion entry from filter cache 50 to filter table 54.

Timeout update thread 166 is a thread that wakes up periodically (e.g., once every second), and checks timeout array 162 to determine whether any timeouts are present in the timeslot corresponding to the current time unit. Timeout update thread 166 may, for example, obtain a current time from a real-time clock of the control CPU and calculate an offset into timeout array 162 based on the current time. In one embodiment, each timeslot in timeout array 162 contains at least one pointer that either points to an entry in filter table 54 or is a null pointer. A null pointer indicates there are no entries in filter table 54 that expire at the corresponding time unit. Alternatively, the filter table may be implemented as a trie or tree, and identifiers (IDs) may be used to store and retrieve data within the filter table. Each element of timeout array 162 may contain one or more IDs that identify respective entries in the filter table. Each ID may be a unique ID that can be used to access the entry in the filter table.

Figure 13:
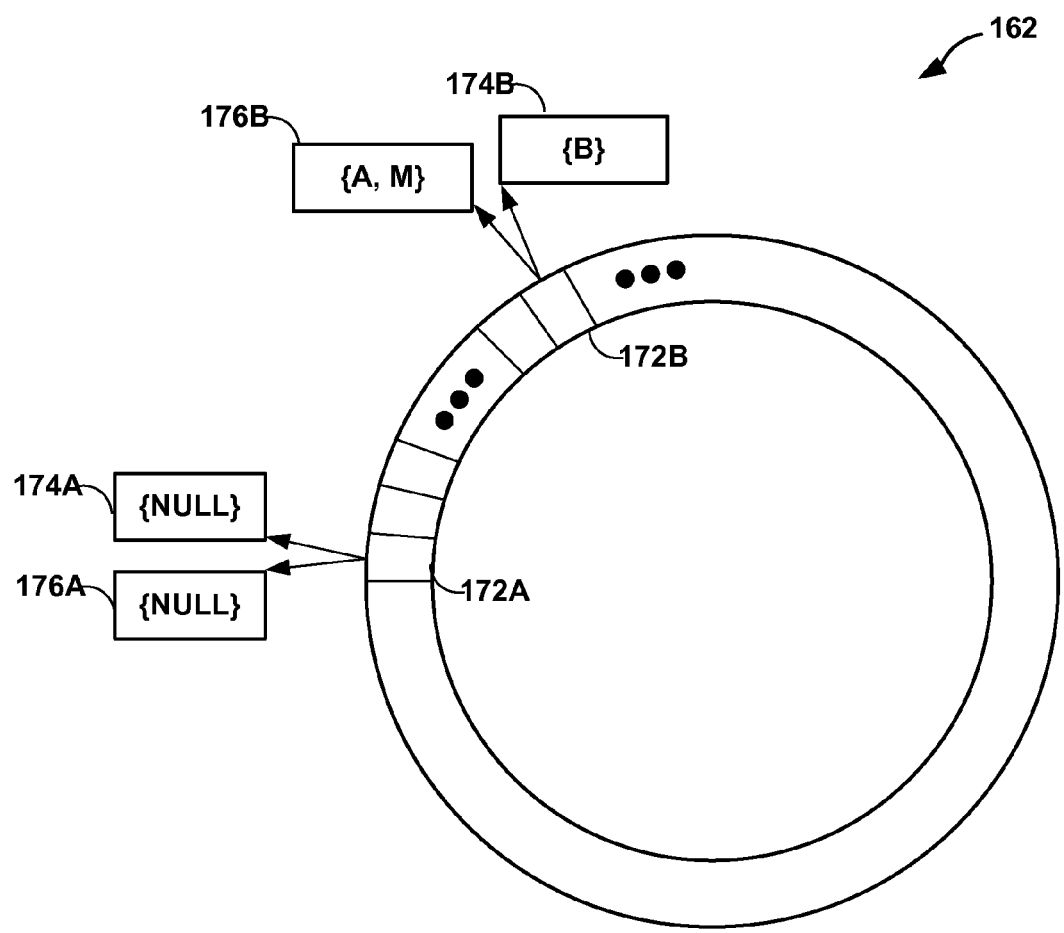
FIG. 13 is an example data structure used for managing filter criteria timeouts.

FIG. 13 is an example timeout array 162 used by flow match timer module 47 for managing filter criteria timeouts. Timeout array 162 includes elements 172, i.e., timeslots, for each unit time of a span of time, e.g., each second in a twenty-four hour period. Thus, in this embodiment, timeouts may be set for a maximum time of twenty-four hours. In this manner, memory space consumed by timeout array 162 may be used as a trade-off for avoiding kernel calls and other resources that would otherwise be required if an underlying operating system were used to maintain individual timers.

In the illustrated embodiment, each timeslot 172 of timeout array 162 includes two pointers: a total timeout pointer 174 and an idle timeout pointer 176, which are used to point to filter criteria having a total time and idle time, respectively, that expires at that unit of time. In the example of FIG. 13, both total timeout pointer 174A and idle timeout pointer 176A of timeslot 172A are null pointers. In contrast, total timeout pointer 174B of timeslot 172B points to entry B in filter table 54, and idle timeout point 176B points to entries A and M of filter table 54. In another embodiment (not shown), timeout array 162 may consist of two separate circular arrays; a total timeout array and an idle timeout array. In this embodiment, timeout update thread 166 checks both arrays every second.

When flow match timer module 47 receives a new timeout to be added to timeout array 162, timer control module 164 determines the appropriate timeslot of timeout array 162 to be marked using the current time and the timeout time. Timeout update thread 166 wakes up each second and checks timeout array 162 to see whether any timeouts are present in the timeslot corresponding to the current time.

Figure 14:
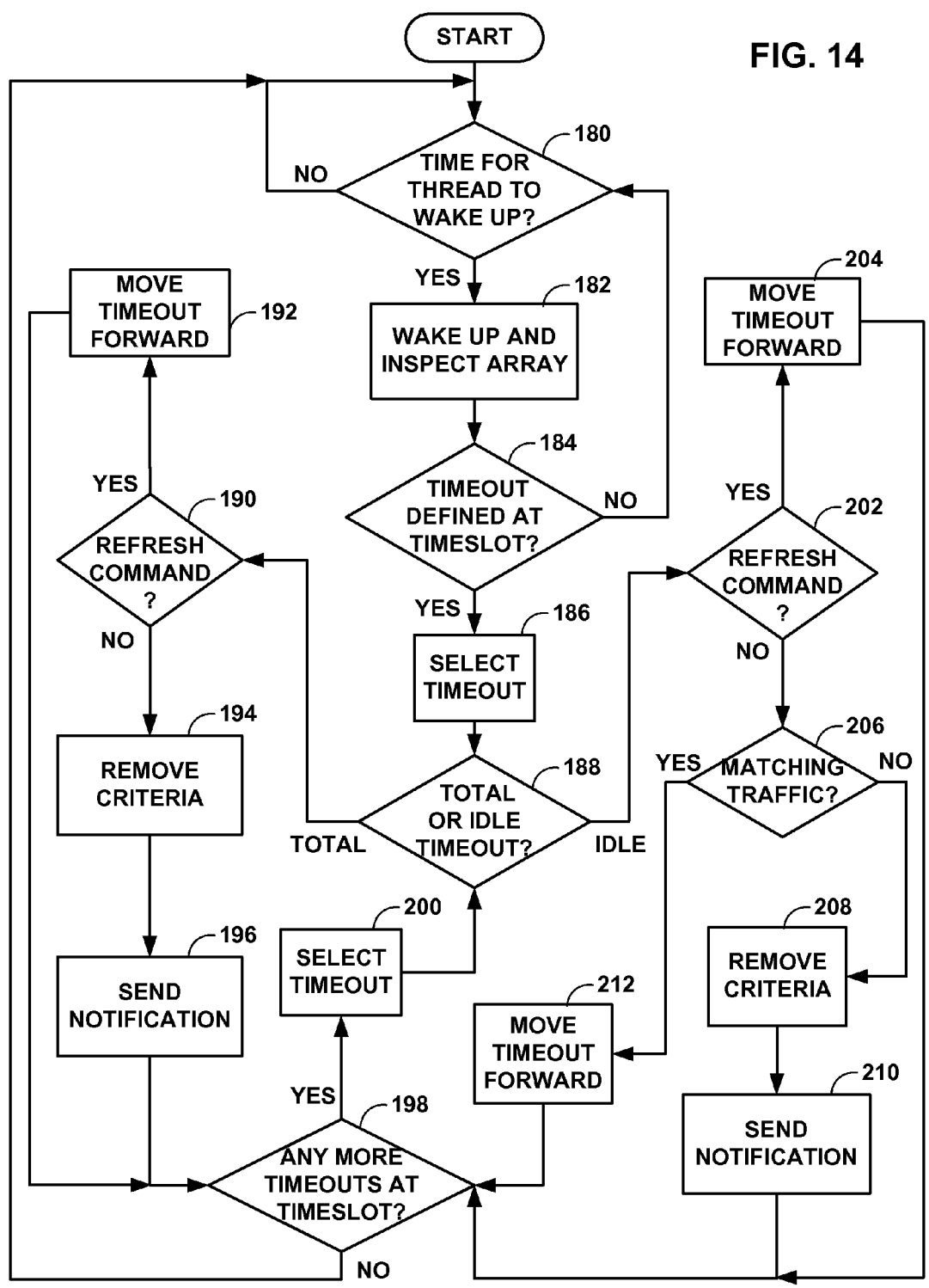
FIG. 14 is a flow chart illustrating example operation of a timeout update thread in handling filter criteria timeouts in accordance with the principles of the invention.

FIG. 14 is a flow chart illustrating example operation of timeout update thread 166 in handling filter criteria timeouts in accordance with the principles of the invention. Timeout update thread 166 is in an idle state until "woken up" by the operating system according to the defined periodic interval (180). When it is time to wake up (e.g., once every second), the operating system transitions timeout update thread 166 to an execution state, at which time the timeout update thread inspects the timeslot of timeout array 162 that corresponds to the current time by calculating an index into timeout array 162 (182). If there are no timeouts defined at the timeslot (i.e., the total timeout pointer and the idle timeout pointer are both null pointers) (NO branch of 184), timeout update thread 166 goes back to sleep until again executed by the operating system (180).

However, if there are one or more timeouts defined at the timeslot of the current time unit (i.e., at least one of the total timeout pointer and the idle timeout pointer is not a null pointer) (YES branch of 184), timeout update thread 166 selects one of the timeouts and follows the pointer to the corresponding entry in filter table 54 (186). There may be more than one timeout per timeslot, since more than one entry of filter table may have a total timeout or idle timeout that expires at that particular time.

When the selected timeout is a total timeout (188), timeout update thread 166 determines whether there has been a refresh command for the filter criterion entry (190). In other words, by comparing the add/refresh timestamp 73 associated with the entry in filter table 54 to the current time, timeout update thread 166 may observe that the entry has been recently refreshed. When the entry has been refreshed (YES branch of 190), timeout update thread 166 moves the timeout forward in the array to a new timeslot according to the amount of time in total timeout column 76 of the entry (192). When the entry has not been refreshed (NO branch of 190), timeout update thread 166 causes control unit 42 (FIG. 3) to remove the filter criterion entry from filter table 54 (194). CS interface 44 sends a notification that the criterion will be deleted to the appropriate control source (196). If there are no more timeouts in the timeslot of timeout array 162 (NO branch of 198), timeout update thread 166 goes back to sleep until it is time to wake up again (180). If there are more timeouts in the timeslot, timeout update thread 166 selects another timeout (200).

When the selected timeout is an idle timeout (188), timeout update thread 166 similarly determines whether there has been a refresh command for the filter criterion entry (202). When the entry has been refreshed (YES branch of 202), timeout update thread 166 moves the timeout forward in the array to a new timeslot according to the amount of time in total timeout column 76 of the entry (204). When the entry has not been refreshed (NO branch of 202), timeout update thread 166 determines whether any traffic (i.e., packets) has been received that matches the filter criterion associated with the idle timeout (206). Timeout update thread 166 follows the pointer to the appropriate entry of filter table 54, and compares the traffic timestamp to the current time.

If timeout update thread 166 determines that DFC service card 29A has received matching traffic within the idle timeout time, timeout update thread 166 moves the timeout forward to a new timeslot in the array according to the difference between the defined timeout value and the amount of time that has elapsed since the traffic timestamp time (212). If the traffic timestamp is blank, as is the case for filter criterion C of filter table 54 (FIG. 5), or is longer ago than the idle timeout amount (NO branch of 206), timeout update thread 166 causes control unit 42 (FIG. 3) to remove the filter criterion entry from filter table 54 (208). CS interface 44 sends a notification that the criterion will be deleted to the appropriate control source (210). If there are no more timeouts in the timeslot of timeout array 162 (NO branch of 198), timeout update thread 166 goes back to sleep until it is time to wake up again (180). If there are more timeouts in the timeslot, timeout update thread 166 selects another timeout (200), and continues until all the timeouts in the timeslot have been handled.

If a large number of timeouts are defined for a particular element of timeout array 162 (i.e., a pointer points to a large number of entries in filter table 54), the timeouts may be spread out (overflowed) so that processing the timeouts will not dominate the CPU. In some embodiments, delay of a few seconds before checking the entry of filter table is acceptable. In this manner, the techniques allow for handling the large amount of timeouts used when monitoring a high volume of packet flows, without placing extreme demands on the operating system for managing the timeouts. The techniques may be applied in large networks that may have one or more million of concurrent packet flows, and where control sources may define hundreds of thousands of filter criteria entries in order to target specific communications.

Various embodiments of the invention have been described. Although described with respect to lawful intercept, the technique can readily be applied to other environments where multiple control sources need to independently monitor and intercept particular packet flows. Examples of other such environments include system administration, accounting, traffic analysis, network attack detection, intrusion detection and the like. These and other embodiments are within the scope of the following claims.

The invention claimed is:

1. A router comprising:
   a network interface card to receive a packet from a network;
   a routing engine that maintains routing information that describes a topology of the network;
   a forwarding engine, wherein the routing engine directs the forwarding engine to maintain forwarding information in accordance with the routing information, wherein the forwarding engine uses the forwarding information for forwarding packets received via the network interface card;
   a dynamic flow capture (DFC) service card executing a communication protocol to receive, from one or more control sources (CSs), flow capture information specifying at least one destination, filter criteria for matching one or more packet flows, and a timeout associated with the filter criteria;
   a packet replication module to replicate the packet received by the network interface card;
   a control unit to provide the replicated packet from the network interface card to the DFC service card; and
   a timeout array comprising a plurality of elements, wherein the timeout array represents a span of time and the elements represent sequential units of time;
   wherein the forwarding engine outputs the packet to a destination in accordance with the forwarding information.

2. The router of claim 1, further comprising:
   a flow match timer module that updates an element of the timeout array to identify the filter criteria, wherein the updated element represents a time unit within the span of time that corresponds to the timeout for the filter criteria.

3. The router of claim 2, further comprising a periodic thread that selects an element of the timeout array based on a current time, wherein the periodic thread computes an index into the timeout array based on the current time to select the element of the array that corresponds to the current time.

4. The router of claim 3, wherein when the selected element contains a pointer to an entry in a filter table, the flow match timer module accesses the entry of the filter table to determine whether the entry indicates a refresh command was received for the entry.

5. The router of claim 2, wherein the elements of the timeout array represent sequential seconds.

6. The router of claim 5, wherein the timeout array comprises a circular timeout array representing one day, wherein the elements represent 86,400 sequential seconds.

7. The router of claim 2, wherein the timeout array is maintained within user space of the DFC service card.

8. The router of claim 2, wherein each of the entries of the timeout array includes a total timeout pointer and an idle timeout pointer, wherein each of the total timeout pointer and the idle timeout pointer is a null pointer or a pointer to an entry in a filter table.

9. The router of claim 2,
   wherein the flow match timer module selects an element that corresponds to the current time; and
   wherein when the element contains a pointer to an entry in a filter table, the flow match timer module accesses the entry of the filter table to determine whether the entry indicates a refresh command was received for the entry.

10. The router of claim 9, wherein when the accessed entry indicates a refresh command was received for the entry, the flow match timer module moves the pointer from the selected element to another element according to a value of a timeout in the accessed entry.

11. The router of claim 10,
    wherein when the pointer is a total timeout pointer and when the accessed entry indicates a refresh command was not received for the accessed entry, the flow match timer module deletes the accessed entry from the filter table, and sends a notification that the accessed entry is being deleted.

12. The router of claim 10, further comprising:
    when the pointer is an idle timeout pointer and when the accessed entry indicates a refresh command was not received for the accessed entry, the flow match timer module determines whether traffic was received that matched criteria contained in the accessed entry.

13. The router of claim 11, further comprising:
    when traffic was not received for the accessed entry, the flow match timer module deletes the accessed entry from the filter table, and sends a notification that the accessed entry is being deleted.

14. The router of claim 2, wherein the flow match timer module updates an element of the timeout array to identify the filter criteria by setting a pointer to point to an entry in a filter table containing a plurality of entries, wherein each entry of the filter table specifies a filter defining: (i) at least one criteria of: a source IP address, a destination IP address, a source port, a destination port, or a protocol, (ii) a control source that requested the filter, (iii) a destination to which replicated packets matching the criteria should be sent, and (iv) at least one timeout indicating when the entry expires.

15. A dynamic flow capture (DFC) service card comprising:
    an electrical interface for insertion within a slot of a network device;
    a control source (CS) interface, executing within the DFC service card, that receives flow capture information specifying at least one network packet flow destination, filter criteria for matching one or more network packet flows, and a timeout associated with the filter criteria;
    a timeout array comprising a plurality of elements, wherein the timeout array represents a span of time and the elements represent sequential units of time; and
    a flow match timer module that updates an element of the timeout array to identify the filter criteria, wherein the updated element represents a time unit within the span of time that corresponds to the timeout for the filter criteria.

16. The router of claim 11, wherein the flow match timer module determines whether traffic was received that matched criteria contained in the accessed entry by comparing a traffic timestamp of the accessed entry to a current time.

* * * * *